US011232117B2

(12) United States Patent
Mulder et al.

(10) Patent No.: US 11,232,117 B2
(45) Date of Patent: Jan. 25, 2022

(54) APPARATUSES, METHODS AND SYSTEMS FOR RELEVANCE SCORING IN A GRAPH DATABASE USING MULTIPLE PATHWAYS

(71) Applicant: Refinitiv US Organization LLC, New York, NY (US)

(72) Inventors: Andrew T. Mulder, Watertown, MA (US); Joseph A. Rothermich, Somerville, MA (US); Henry Chong, Cambridge, MA (US)

(73) Assignee: REFINITIV US ORGANIZATION LLC, New York, NY (US)

( * ) Notice: Subject to any disclaimer, the term of this patent is extended or adjusted under 35 U.S.C. 154(b) by 283 days.

(21) Appl. No.: 15/660,301

(22) Filed: Jul. 26, 2017

(65) Prior Publication Data

US 2018/0004822 A1    Jan. 4, 2018

Related U.S. Application Data

(63) Continuation of application No. PCT/US2017/039792, filed on Jun. 28, 2017.
(Continued)

(51) Int. Cl.
*G06F 16/901* (2019.01)
*G06F 16/248* (2019.01)
(Continued)

(52) U.S. Cl.
CPC ...... *G06F 16/248* (2019.01); *G06F 16/24578* (2019.01); *G06F 16/9024* (2019.01);
(Continued)

(58) Field of Classification Search
CPC ........ G06F 3/0482; G06F 9/451; G06F 16/26; G06F 16/34; G06F 17/24; G06F 21/6218; G06F 3/04842; G06F 3/04847; G06F 16/248; G06F 16/951; G06F 16/24578; G06F 16/9024; G06Q 40/06; G06T 11/206
See application file for complete search history.

(56) References Cited

U.S. PATENT DOCUMENTS 7,512,612 B1 *    3/2009  Akella ................... H04L 51/32
9,189,567 B1 *   11/2015  Goldman .............. G06Q 50/01
(Continued)

OTHER PUBLICATIONS

E. W. Dijkstra. "A Note on Two Problems in Connexion with Graphs." Numerische Mathematik 1, 269-271 (1959).
(Continued)

*Primary Examiner* — Marcin R Filipczyk
(74) *Attorney, Agent, or Firm* — Winthrop & Weinstine, P.A.

(57) ABSTRACT

In accordance with one aspect, the present disclosure is directed to quantifying the relevance between two entities in a graph database. One way of doing this is determining the number of pathways and the length of the pathways within the graph database that connect the two entities, wherein each entity is represented as a node. In some implementations, the present disclosure identifies and quantifies the connection between a news document (e.g., a news article) and a company or other entity. For example, the connection between an online news article and a company's underlying equity instrument can be evaluated.

14 Claims, 12 Drawing Sheets

Related U.S. Application Data

(60) Provisional application No. 62/355,365, filed on Jun. 28, 2016.

(51) Int. Cl.
*G06F 16/2457* (2019.01)
*G06F 3/0484* (2013.01)
*G06T 11/20* (2006.01)

(52) U.S. Cl.
CPC ...... *G06F 3/04842* (2013.01); *G06F 3/04847* (2013.01); *G06T 11/206* (2013.01); *G06T 2200/24* (2013.01)

(56) References Cited

U.S. PATENT DOCUMENTS

| | | |
|---|---|---|
| 2012/0271837 A1 | 10/2012 | Kryger et al. |
| 2013/0254303 A1* | 9/2013 | Cheng .................. G06Q 10/101 709/206 |
| 2014/0188935 A1 | 7/2014 | Vee et al. |
| 2014/0280360 A1 | 9/2014 | Webber et al. |
| 2016/0117413 A1 | 4/2016 | Botea et al. |
| 2017/0255686 A1* | 9/2017 | Ross ..................... G06F 3/0485 |

OTHER PUBLICATIONS

USPTO. International Search Report for related PCT Application No. PCT/US2017/039792, 1 pg. (dated Sep. 15, 2017).
Written Opinion from Singapore Patent Application No. 11201811607V (counterpart application to 15660301) dated Apr. 21, 2020.

\* cited by examiner

APPARATUSES, METHODS AND SYSTEMS FOR RELEVANCE SCORING IN A GRAPH DATABASE USING MULTIPLE PATHWAYS This application for letters patent discloses and describes various novel innovations and inventive aspects of graph database analysis technology (hereinafter "disclosure") and contains material that is subject to copyright, mask work, or other intellectual property protection. The respective owners of such intellectual property have no objection to the facsimile reproduction of the disclosure by anyone as it appears in published Patent Office file/records, but otherwise reserve all rights.

PRIORITY CLAIM

This application is a continuation of and claims the benefit of priority to International Application No. PCT/US2017/39792, filed Jun. 28, 2017, which in turn claims the benefit of priority under 35 USC § 119 to U.S. provisional patent application Ser. No. 62/355,365 filed Jun. 28, 2016, entitled "DATA FUSION ANALYTICS."

The entire contents of each of the aforementioned patent applications is expressly incorporated by reference herein for any purpose whatsoever.

FIELD

The present innovations generally address apparatuses, methods, and systems for identifying meaningful associations between elements associated with nodes in a graph database, and more particularly, include analytical methods for determining the relevance between elements in a graph database based on multiple criteria. As such, the present innovations include (at least) the following two distinct areas, including:

a search engine (with a suggested Class/Subclass of 707/705-711, 723, 749); and a search engine (with a suggested Class/Subclass of 706/45, 50);

However, in order to develop a reader's understanding of the innovations, descriptions have been compiled into a single disclosure to illustrate and clarify how aspects of these innovations operate independently, interoperate as between individual innovations, or cooperate collectively. The application goes on to further describe the interrelations and synergies as between the various innovations; all of which is to further comply with 35 U.S.C. § 112.

BACKGROUND

Many products deliver news articles or news feeds to the user. Typically, this news is selected by a computer algorithm in order to be relevant to the user. One established method of delivering relevant news is to select news documents that mention companies in the user's portfolio or "watch list". The problem is that often news articles will impact a company or an industry without explicitly mentioning the company. The presently disclosed embodiments provide solutions to these, and other problems in the art.

SUMMARY

Advantages of the present disclosure will be set forth in and become apparent from the description that follows. Additional advantages of the disclosure will be realized and attained by the methods and systems particularly pointed out in the written description and claims hereof, as well as from the appended drawings.

In accordance with one aspect, the present disclosure is directed to quantifying the relevance between two entities in a graph database. One way of doing this is determining the number of pathways and the length of the pathways within the graph database that connect the two entities, wherein each entity is represented as a node.

In some implementations, the present disclosure identifies and quantifies the connection between a news document (e.g., a news article) and a company or other entity. For example, the connection between an online news article and a company's underlying equity instrument can be evaluated.

Many products (e.g. brokerage software, financial research software) deliver news articles or news feeds to the user. Typically, this news is selected by a computer algorithm in order to be relevant to the user. One established method of delivering relevant news is to select news documents that mention companies in the user's portfolio or "watch list". The problem is that often news articles will impact a company, or even a whole portfolio, without explicitly mentioning the company. For example, a story about the bankruptcy of GT Advanced Technologies (GTAT) may contain explicit mentions of only GTAT, and not any other company. But, such an article could be highly relevant to Apple Inc., who has significant supply chain relations with GTAT. In one aspect, the presently disclosed implementations identify and quantify such "hidden" connections, thereby allowing the system to display this news to users that have shown interest or stake in Apple Inc.

Thus, in accordance with some implementations, the disclosure provides a graph based computer-implemented method of quantifying the relationship between entities disposed within a graph database, wherein each entity is associated with a discrete node in the graph database. The method includes receiving a first input identifying a first entity, receiving a second input identifying a second entity, associating the first entity and the second entity with respective discrete first and second nodes in a graph database via a processor, identifying a plurality of pathways that connect the first node and second node in the graph database based on predetermined criteria via the processor, wherein each predetermined criterion in the predetermined criteria relates to a discrete relationship attribute, computing a pathway score for each identified pathway in the plurality of pathways via the processor, and selecting a subset of the identified pathways based on a magnitude of the pathway score for each identified pathway based at least in part on the pathway score for each identified pathway.

In accordance with particular implementations, the method can further include generating output display data based on the subset of the identified pathways that summarizes the relationship between the first and second entities via the processor. The method can further include displaying a graphical user interface that displays the output display data via the processor. If desired, generating the output display data can further include computing a relevance score indicative of the relevance of the first entity with respect to the second entity via the processor, wherein the relevance score is computed at least in part based on the pathway score computed for each pathway in the subset of identified pathways, and the displaying step can further include displaying the relevance score on the graphical user interface.

In some implementations, generating the output display data can further include generating a visual representation of the subset of identified pathways and first and second nodes, and the displaying step can further include displaying the visual representation of the subset of identified pathways and first and second nodes. If desired, the first input and the second input can be received from a user of the system by way of manual entry in a graphical user interface. Alternatively, the first input and second input can be received automatically, such as being facilitated by the execution of a particular machine readable program. For example, the first input and the second input can be received automatically from an updating engine.

In further implementations, identifying the plurality of pathways that connect the first node and second node can include identifying at least one pathway that includes at least one further node in the graph database disposed between the first node ad the second node. That is to say, said pathway can span at least one intermediate node.

In some embodiments of the graph based computer-implemented method, the predetermined criteria can be user selectable. Additionally or alternatively, the predetermined criteria can be assigned weighting factors. If desired, the pathway score for each of the identified pathways can be computed based at least in part on at least one of the weighting factors. In some implementations, the weighting factors can be wholly or partially user selectable by a user through a graphical user interface.

In still further implementations, generating the output display data can further include generating a rendering of the subset of identified pathways and first and second nodes, and the displaying step can further include displaying the rendering of the subset of identified pathways and first and second nodes. If desired, generating the output display data can additionally or alternatively include generating a plurality of textual natural language sentences via processor, wherein each of said textual natural language sentences relates to a discrete pathway in the subset of identified pathways, wherein each said textual natural language sentence summarizes the subject matter of each respective pathway, and the displaying step can accordingly further include displaying the textual natural language sentences in the graphical user interface. For example, the displayed information can be displayed in the GUI in a manner wherein a user can selectively highlight visual representations relating to each pathway in the subset of identified pathways. If desired, the user can selectively highlight visual representations of each pathway in the subset of identified pathways by hovering a cursor over the visual representation of a selected pathway. The visual representation of the selected pathway can include the rendering of the subset of identified pathways and first and second nodes, and any intermediate nodes, as desired. The visual representation of the selected pathway can include the textual natural language sentences. If desired, selectively highlighting the visual representation of a selected pathway can cause the selected pathway to be highlighted in the rendering of the subset of identified pathways and first and second nodes. This can also cause the corresponding textual natural language sentence in the graphical user interface to also be highlighted. The rendering of the subset of identified pathways and first and second nodes can be configured to display a plurality of intermediate nodes. Accordingly, at least one of the pathways in the plurality of pathways can transverse one or more plurality of intermediate nodes.

The disclosure further provides a graph based computer-implemented method of quantifying the relationship between entities disposed within a graph database, wherein each entity is associated with a discrete node in the graph database. The method includes receiving a first input identifying a first entity, receiving a second input identifying a second entity, associating the first entity and the second entity with respective discrete first and second nodes in a graph database via a processor, identifying a plurality of pathways that connect the first node and second node in the graph database based on predetermined criteria via the processor, wherein each predetermined criterion in the predetermined criteria relates to a discrete relationship attribute, and selecting a subset of the identified pathways based on a path length of each identified pathway. The method can further include any further element described with respect to the methods set forth elsewhere herein.

The disclosure still further provides an online financial portfolio portal system configured to generate and display a graphical user interface that presents a listing of a plurality of securities, each security relating to a company. The system further includes a news feed matching engine configured and adapted to receive a first input identifying a first company in the portfolio, receive a second input identifying a news story, associate the first company and the news story with respective discrete first and second nodes in a graph database via a processor, identify a plurality of pathways that connect the first and second nodes in the graph database based on predetermined criteria via the processor, wherein each predetermined criterion in the predetermined criteria relates to a discrete relationship attribute, if desired compute a pathway score for each identified pathway in the plurality of pathways via the processor, select a subset of the identified pathways based, for example, on a magnitude of the pathway score for each identified pathway, and/or a path length of each said pathway, and generate output display data based on the subset of the identified pathways that summarizes the relationship between the first company and the news story via the processor.

The online financial portfolio portal system can further include any further element described with respect to any other embodiment set forth elsewhere herein. For example, in some implementations, the online financial portfolio portal system can be further configured to display the output display data in the graphical user interface via the processor. In some implementations, the graphical user interface can provide a first input field for receiving the first input from a user, and a second input field for receiving the second input from the user, or the inputs may be provided automatically as described elsewhere herein with respect to other embodiments.

Said predetermined criteria described herein can relate to one or any combination of (i) an economic sector, (ii) an industry group, (iii) whether the first company has a parent, (iv) whether the first company has a subsidiary, (v) whether the first company has a supplier, (vi) whether the first company is a supplier for another entity, (vii) whether an individual is a board member or director of the first company, (vii) whether an individual is an insider of the first company, (viii) whether the first company has an ultimate parent; (ix) whether the first company has a business relationship with a second company, and (x) whether the first company and a second company have a person in common, among other attributes.

The disclosure still further provides apparati comprising a plurality of circuit modules configured and arranged to quantify the relationship between entities disposed within a graph database, wherein each entity is associated with a discrete node in the graph database. Any methods and systems described elsewhere herein can be expressed accordingly as a plurality of circuit modules configured an arranged to execute desired recited functions associated with said methods and systems.

For example, in one implementation, such an apparatus can include a first circuit module configured and arranged to receive a first input identifying a first entity, a second circuit module configured and arranged to receiving a second input identifying a second entity, a third circuit module configured and arranged to associate the first entity and the second entity with respective discrete first and second nodes in a graph database via a processor, a fourth circuit module configured and arranged to identify a plurality of pathways that connect the first node and second node in the graph database based on predetermined criteria via the processor, wherein each predetermined criterion in the predetermined criteria relates to a discrete relationship attribute, a fifth circuit module configured and arranged to compute a pathway score for each identified pathway in the plurality of pathways via the processor, and a sixth circuit module configured and arranged to select a subset of the identified pathways based on a magnitude of the pathway score for each identified pathway based at least in part on the pathway score for each identified pathway.

In further implementations, the disclosure provides embodiments of an apparatus including a plurality of circuit modules and at least one processor configured and arranged to quantify the relationship between a company and a news story, wherein each of the company and news story are associated with a discrete node in a graph database. The circuit modules can include a first circuit module configured and arranged to receive a first input identifying the company via the processor, a second circuit module configured and arranged to receiving a second input identifying the news story via the processor, a third circuit module configured and arranged to associate the company and the news story with respective discrete first and second nodes in the graph database via the processor, a fourth circuit module configured and arranged to identify at least one pathway that connect the first node and second node in the graph database based on predetermined criteria via the processor, wherein each predetermined criterion in the predetermined criteria relates to a discrete relationship attribute, and a fifth circuit module configured and arranged to compute a pathway score for each said at least one pathway via the processor. If desired, the apparatus can further include a sixth circuit module configured and arranged to select a subset of identified pathways based on a magnitude of the pathway score for each identified pathway based at least in part on the pathway score for each identified pathway.

It is to be understood that the foregoing general description and the following detailed description are exemplary and are intended to provide further explanation of the disclosed embodiments. The accompanying drawings, which are incorporated in and constitute part of this specification, are included to illustrate and provide a further understanding of the disclosed methods and systems. Together with the description, the drawings serve to explain principles of the disclosure.

BRIEF DESCRIPTION OF THE DRAWINGS

The accompanying appendices, drawings, figures, images, etc. illustrate various example, non-limiting, inventive aspects, embodiments, and features ("e.g.," or "example(s)") in accordance with the present disclosure:

FIG. 2I shows an enlarged view of a graphical display of FIG. 2A illustrating connections between nodes.

DETAILED DESCRIPTION

Reference will now be made in detail to the present preferred embodiments of the disclosure, examples of which are illustrated in the accompanying drawings. The methods and corresponding steps of the disclosed embodiments will be described in conjunction with the detailed description of the system.

Thus, in accordance with some implementations, the disclosure provides a graph based computer-implemented method of quantifying the relationship between entities disposed within a graph database. In some implementations, this is accomplished by identifying multiple meaningful pathways connecting the entities within the database, and selecting a subset of the pathways based on particular criteria. In some other implementations, the method can quantify the relationship based at least in part on the shortest path that connects the entities.

Various illustrated embodiments herein focus on determining the relevance of a news story with respect to a company via a graph database utilizing analytical tools as described herein. This can be accomplished by connecting a news document (associated with a first node) to a portfolio holding (associated with a second node). A relevance score can be computed that in turn can depend on the pathway between the news document and the portfolio holding in the graph, where a higher score reflects that the news story has a higher impact on the portfolio holding.

However, the disclosure is not limited to financial applications, and is applicable to any desired implementation for leveraging seemingly unconnected entities within a graph database using such tools. These tools exploit the data structure within graph databases in order to identify otherwise hidden or subdued relationships within nodes in the graph database. As such, the disclosed embodiments are, by definition, technological in nature.

Various additional implementations of the disclosed tools and technological approaches herein can equivalently be applied to graph databases including social media data (e.g., Facebook®, LinkedIn®, and the like) to identify relationships between data nodes associated with people, companies, technologies, world events, and the like. Such tools can be used for scientific research, social science studies, and many other fields, wherein finance is only one of many implementations. Accordingly, the presently disclosed embodiments provide a new and unique research tool to leverage so-called "big data" in relevant and useful ways to provide a concrete and tangible end product by transforming inputs identifying two entities in a graph database into useful outputs that identify the various ways in which those entities are connected.

Thus, in accordance with some implementations, the disclosure provides a graph based computer-implemented method of quantifying the relationship between entities disposed within a graph database, wherein each entity is associated with a discrete node in the graph database.

Figure 1:
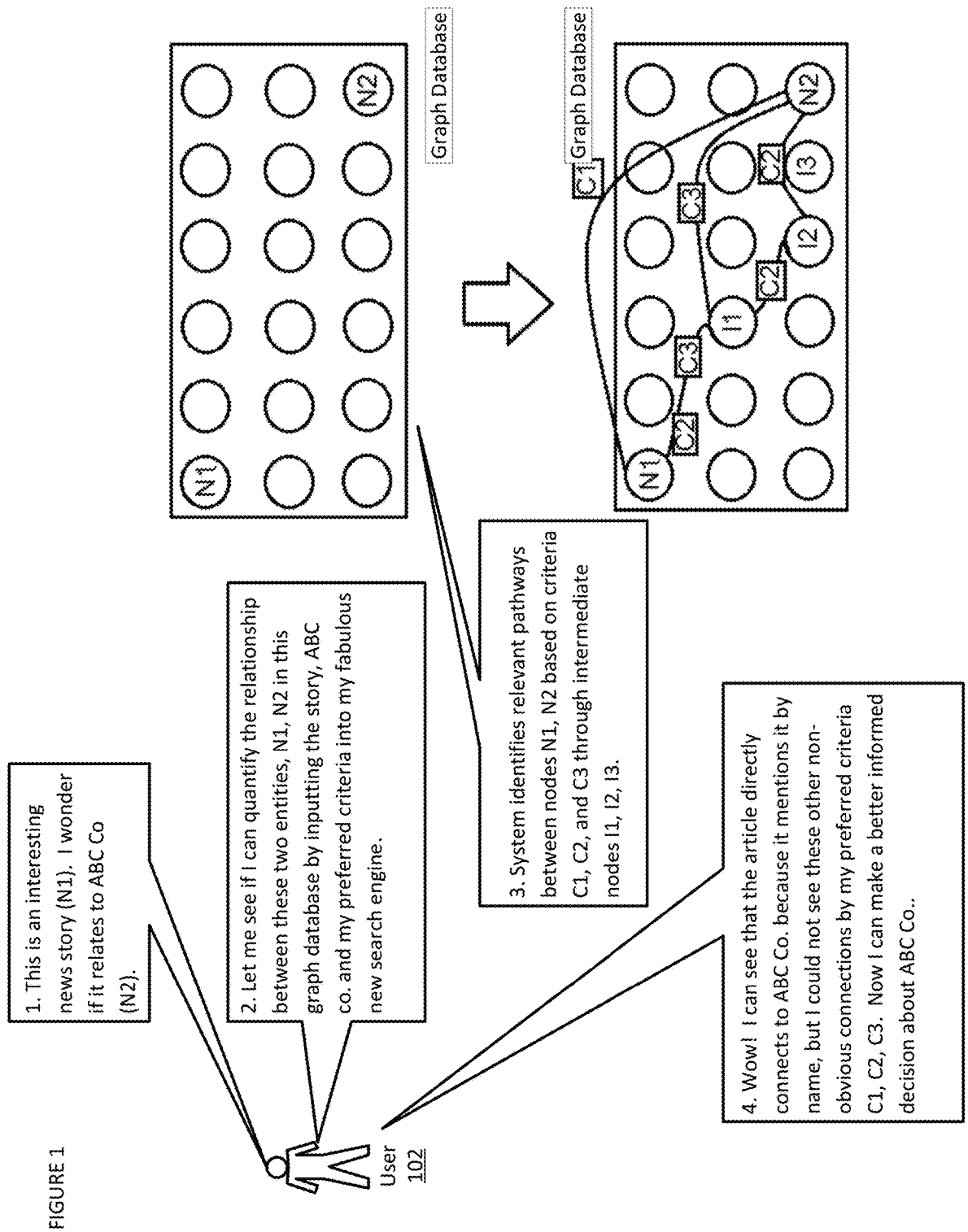
FIG. 1 shows an exemplary usage scenario in one embodiment of a system in accordance with the disclosure.

For purposes of illustration, and not limitation, FIG. 1 shows an exemplary usage scenario in one embodiment of the disclosure. In FIG. 1, a user 102 may utilize an embodiment of the disclosed system to analyze, and quantify, the relevance of a first element, such as a news story N1 with respect to a second element, such as a company N2 (e.g., a publicly-traded corporation). The user may input the news story and the company, which are associated with nodes N1, N2 in a graph database, into a system provided in accordance with the disclosure. The user may then specify desired criteria C1, C2, C3 that could be used to link the news story to the corporation, such as whether a company referenced in the news article is related to the company, whether a person mentioned in the article is or was associated with the company, among many other possible criteria. When actuated based on these inputs, the system then analyzes the relevance of the news article with respect to the company based on the criteria, and then may show a graphic that quantifies the relevance of the news story with respect to the company, evidencing direct, and more attenuated, or hidden, relevancies.

An illustrative example of one implementation in accordance with the disclosure is provided in FIGS. 2A-2F.

Figure 2A:
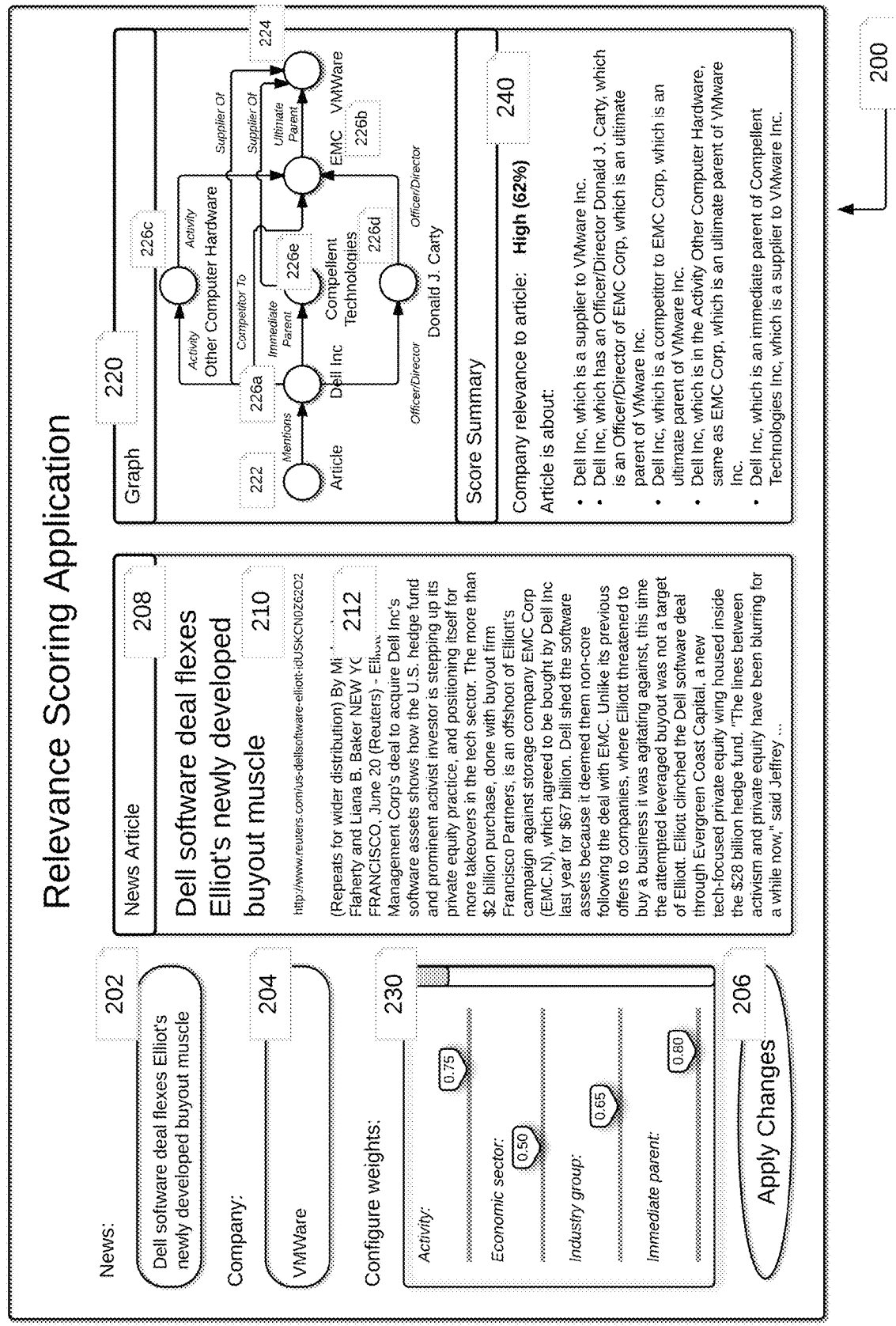
FIG. 2A shows a screen shot diagram illustrating aspects of an embodiment in accordance with the disclosure.

In FIG. 2A, a user is presented with a graphical user interface ("GUI") 200 generated and presented by the system. As illustrated, GUI 200 includes a first data entry field 202 for entering information for searching for and/or that identifies a particular news story, and a second data entry field 204 that identifies a company by name, wherein the user's objective is to identify the most relevant pathway(s) that connect the news story to the company. Such analysis can bring new additional information to light, revealing hidden connections that connect the news story to the company. This information can ultimately lead to additional insight about the company and facts that may affect the value of securities associated with the company.

The user may then select or actuate the "Apply Changes" button 206 to cause the system to identify the relevance between the news story and the company. This causes the system to analyze a graph database associated with the system including a plurality of nodes, wherein each of the news story and the company are associated with at least one node.

The system may execute this search based on criteria that is fixed, and/or criteria that is set in place by a user. In some implementations, criteria can be user selectable and can be weighted by the user to emphasize one criteria over another. Such criteria in an example such as that which is illustrated can relate to one or any combination of (i) an economic sector that the company is in, (ii) an industry group that the company is in, (iii) whether the company has a parent, (iv) whether the company has a subsidiary, (v) whether the company has a supplier, (vi) whether the company is a supplier for or supplied by another entity, (vii) whether an individual is a board member or director, or other person of interest of the company, (vii) whether the company is an insider organization, (viii) whether the company has an ultimate parent; (ix) whether the company has a business relationship with a second company, and (x) whether the company and a second company have a person in common, among other attributes.

As illustrated in FIG. 2A, such factors can be user selectable and assigned weights by way of a weight configuration interface 230. A user can select an actuator/button/pull down menu to expand the interface 230, and the interface can be displayed in the same GUI 200, as illustrated in FIG. 2G. FIG. 2H presents an enlarged view of weighting factors for this illustrative example. The weight of each weighting factor in this implementation can be adjusted by way of a slider that can be selected and dragged to the left or right to provide a relatively increased weight, although it will be appreciated that the weights could be entered as values into a table or field. A relative weight is displayed for each weighting factor, depending on the position of the slider. The particular weighting factors illustrated in the example of FIG. 2H include "Activity" 230$a$, which reflects the "Economic Sector" 230$b$ in which the company operates, the "industry group" 230$c$ in which the company operates, which causes the search engine to consider connecting nodes and pathways that relate to the industry group. The "immediate parent" of the company 230$d$ weighting factor will seek any connections between the company and the news story that relate to its immediate corporate parent, if it has one, and the "ultimate parent" of the company 230$e$, weighting factor will similarly identify any connections between the company and news story that relate to its ultimate parent.

A further criterion can include whether the company is an "insider organization" 230$f$, which would cause the engine to search for connections between the company and people that are insiders of the company (e.g. employees). The weighting factor "is a supplier of" 230$g$ will cause the engine to consider connections implicating the relevance of any other entity that the company is a supplier of. The officer/director factor 230$h$ will cause the system to search for connections between the company and people that are officers or directors of the company.

With continuing reference to FIG. 2H, further criteria can connect the company to nodes that represent specific mutual, hedge, or exchange-traded funds or other securities. One such relationship is the "has custodian of" factor 230$i$, which will connect the company to a fund that the company acts as the custodian of. The "has distributor of" factor 230$j$ will cause the system to identify any intermediate nodes or any relationships that are funds that the company distributes, and the "is advised by" factor 230$k$ will cause the system to identify that relate to a fund to which the company acts in an advisory capacity. Similarly the "is audited by" weighting factor 230$i$ can be selected to the extent it is desired to know connections between a fund or security and the company that relate to an organization that audits or has audited the fund or security, such as an accounting firm or governmental body (e.g., IRS, FDA, etc.). The "investment option of" weighting factor 230$m$ causes the system to identify the companies that offer the fund as an investment, while the "is managed by" weighting factor 230$n$ will cause the system to identify connections that relate to a company that is responsible for managing the fund. The "company competitor" weighting factor 230$o$ will seek connections between the news article and the company that mentions or otherwise relates to a competitor of the company, whereas the "company customer" weighting factor 230$p$ will seek connections between the news article and the company that mentions or otherwise relates to a customer of the company. Finally, the "other" weighting factor 230q will identify "other", or miscellaneous connections that connect the news article to the company. Once the weighting factors are set, the user can actuate the "apply changes" button to cause the system to re-quantify the relevance of the news story to the company based on the updated weighting factors.

It will be appreciated that the user selectability of the weighting factors makes the system more useful for a diverse audience of analysts seeking different types of information. If desired, the system can be preconfigured with different sets of weights for users seeking different types of connections between the news story and the company.

With continuing reference to FIG. 2A, the GUI further includes a title field 208 for displaying the title of the news article of interest, a URL field 210 for displaying the URL of the news article, and a content field 212 for displaying the content of the article to permit a user to review the content of the article itself.

In further accordance with the disclosure, the GUI also includes sections for displaying system outputs based on the inputs. A graph window 220 is provided for displaying a graphical representation of the relationship between a first node 222 in the graph database, in this illustration relating to the news article, and a second node 224 relating to a company. The various connections between nodes 222, 224 are displayed. In this example, the relationship between the nodes 222, 224 is illustrated with respect to a plurality of intermediate nodes 226a-226e. In this example, the system is configured to return the five shortest pathways connecting nodes 222, 224, but it will be appreciated that any number of pathways can be returned, as desired. The pathways between the nodes are based on the subject matter of the weighting factors.

For example, as illustrated in FIG. 2A and as shown in additional detail in FIG. 2I, node 222, which relates to the article is connected to node 226A by a pathway indicating that the article mentioned Dell, Inc. Dell, Inc. is the immediate parent of Compellant Technologies (node 226e), which in turn is a supplier to VMWare (node 224), thus completing the connection pathway between nodes 222 and 224. Additional pathways are defined from nodes 226a-226b0224, wherein Dell, Inc is a competitor to VMWare, and EMC Corp is the ultimate parent of VMWare. A connection is also completed via nodes 226a-226d-226b whereby Donald Carty is a common officer/director of Dell, Inc. and EMC Corp. Moreover, a further pathway is defined from node 226a-226c-226b wherein Dell and EMC Corp. are identified as both being involved in the common activity of the sale of computer hardware. A further direct connection from node 226a-224 is defined by way of Dell, Inc. being a supplier to VMWare.

As further illustrated in FIGS. 2B-2F, a relevance score field is provided in window 240 that is populated with a relevance score (e.g., 62%) by the system based on a weighted average of (in this implementation) the five shortest path lengths connecting nodes 222, 224. The relevance score is determined, in this example, by the weights assigned to each weighting factor assigned by the user. Determination of specific ways of computing the relevance score are discussed in further detail below. Window 240 also includes computer generate natural language sentences that correspond to each of the five illustrated path lengths to provide additional understanding and context.

The natural language sentences in window 240 summarize the corresponding illustrated paths in the graphic above. In this implementation, when the sentence or corresponding graph is selected (such as hovering over it with a cursor), the corresponding graph and sentence are both highlighted to further illustrate correspondence between the two. For example, in FIG. 2B, the pathway 220A from node 222-226a-224 is highlighted, and the corresponding first natural language sentence 240A is also highlighted, which textually summarizes that Dell is a supplier to VMWare. Similarly, as illustrated in FIG. 2C, the pathway 220B from node 222-226a-226d-226b-224 is highlighted, and the corresponding second natural language sentence 240B is also highlighted, which textually summarizes that Dell and EMC have a common officer and director, and that EMC Corp is an ultimate parent of VMWare. As illustrated in FIG. 2D, the pathway 220C from node 222-226a-226b-224 is highlighted, and the corresponding third natural language sentence 240C is also highlighted, which textually summarizes that Dell and EMC are competitors, and that EMC Corp is an ultimate parent of VMWare. As illustrated in FIG. 2E, the pathway 220D from node 222-226a-226c-226b-224 is highlighted, and the corresponding fourth natural language sentence 240D is also highlighted, which textually summarizes that Dell and EMC have a common activity (computer hardware), and that EMC Corp is an ultimate parent of VMWare. Finally, as illustrated in FIG. 2F, the pathway 220E from node 222-226a-226e-224 is highlighted, and the corresponding fifth natural language sentence 240E is also highlighted, which textually summarizes that Dell is an immediate parent of Compellant Technologies, and that the latter is a supplier to VMWare.

It will be further appreciated that, while the illustrated example seeks to identify and quantify the relevance of a news story to a company, even within a business type context, the system can similarly be used to quantify the relevance of a first company to a second company, an industry group to a company or vice-versa, and the like.

Figure 3:
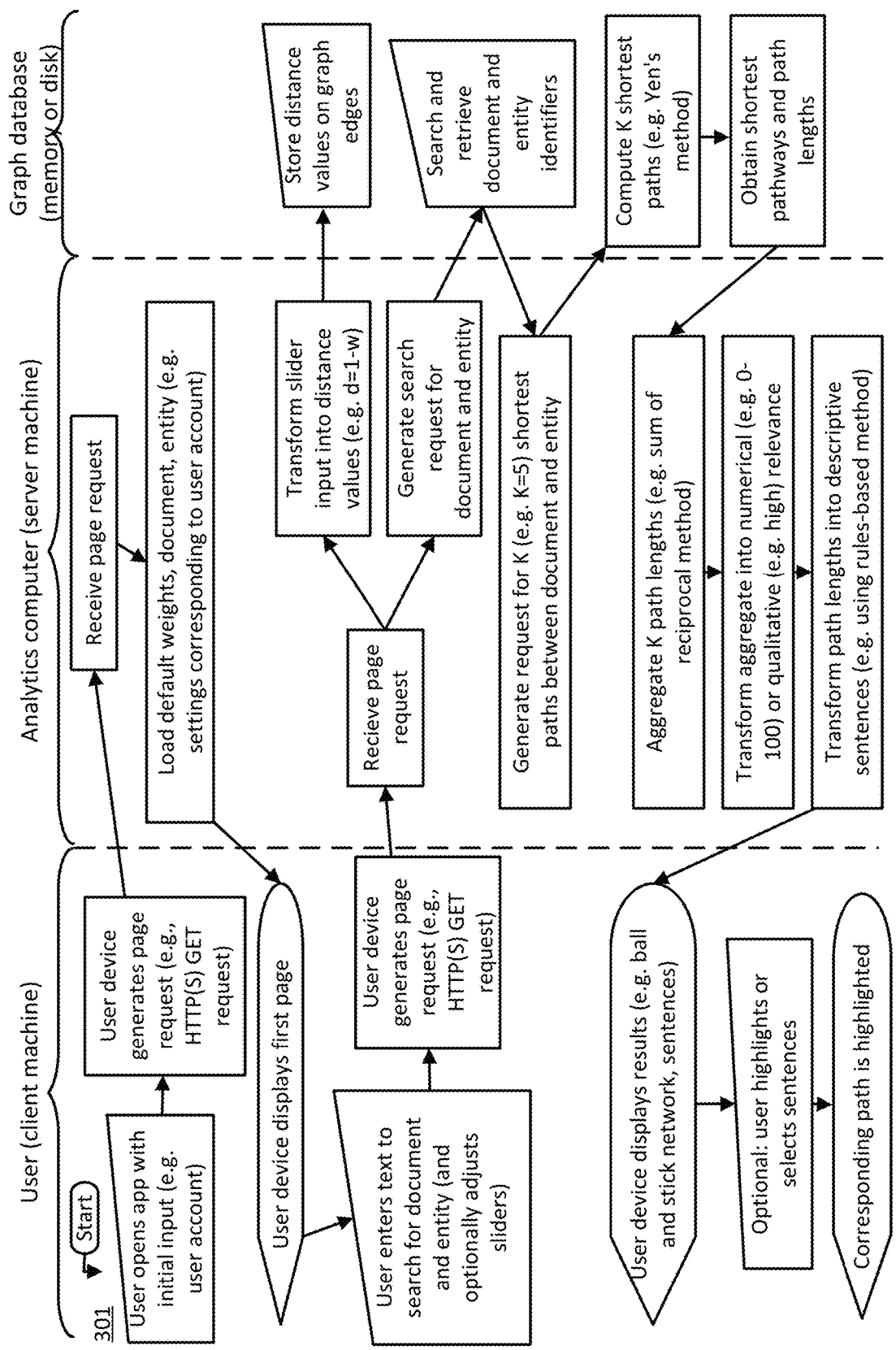
FIG. 3 shows a logic flow diagram illustrating aspects of the system in one embodiment of the present disclosure.

FIG. 3 presents an example of a logic/data flow diagram that illustrates a particular implementation of a system in accordance with the disclosure. While logical elements and steps are presented, it will be appreciated that each actually corresponds to an appropriately programmed circuit module that is configured to execute the logic and move data from one component to another, as instructed by machine readable code that is being executed. The logical steps are separated that take place within or with respect to a machine of a user (client device), an analytics platform (server) and a graph database, wherein the devices are delimited from each other by dashed lines. Data flows from one device to another are represented by arrows crossing the dashed lines.

As illustrated in FIG. 3, an illustrative example begins with a user opening a software program on a remote client device configured to operate the system at 301. The software on the client device generates a page request which is transmitted to the server, which receives the page request. The server generates a page, such as that illustrated in FIG. 2A, which may be loaded with default weighting factors, for example. The weighting factors may be determined with respect to default weighting factors associated with the user's account, if desired. The page is then transmitted back to the client machine where it is displayed as a GUI. The user then enters text (e.g., into fields 202, 204 in FIG. 2A) to search for a document and an entity (and, if desired, to adjust the sliders within window 230). The user device then generates a further page request that is sent back to the server, which receives the page request. If slider input is provided in window 230, the slide inputs are transformed into distance values d, such as 1.0 minus the weight assigned to the particular weighting factor. These distances are then stored on the graph "edges" in the graph database. The server also at this stage generates a search request for the document and the entity. This search request is then directed to the graph database where a search is then conducted, a corresponding document is retrieved as well as identifiers for the entity.

This information is then directed to the server, which in turn generates a request for K (e.g., K=5) shortest paths between the document and the entity. This request is then directed to the graph database where the "K" shortest paths are generated in accordance with a desired algorithm. Any suitable algorithm can be used for determining shortest paths. For example, Yen's method can be used (Yen, Jin Y. (1970). "An algorithm for finding shortest routes from all source nodes to a given destination in general networks". Quarterly of Applied Mathematics. 27: 526-530), which is expressly incorporated by reference herein in its entirety for any purpose whatsoever. Yen's algorithm computes single-source K-shortest loopless paths for a graph with non-negative edge cost.

This is accomplished by first computing "K" shortest paths by utilizing Equation 1 below:

$$\left\{ d_i = \sum_{path\ i} (1 - w) \right\} \quad (1)$$

Next, the total distance is calculated by summing the inverses of each of the "K" shortest paths into the total distance by utilizing Equation 2 below:

$$d_{total} = \left( \sum_{i=0}^{K} \frac{1}{d_i} \right)^{-1} \quad (2)$$

The total distance specified above can, if desired, be used to quantify the relevance of the story to the company, but optionally an additional transform can take place. The total distance can be transformed into a relevance score between 0 and 100 by using Equation 3 below:

$$\text{Relevance} = 100 e^{-K d_{total}} \quad (3)$$

By way of further example, Dijkstra's method for connecting two nodes with a shortest path can be used to calculate one or more of the shortest paths connecting nodes 222, 224 (Dijkstra, E. W. (1959). "A note on two problems in connection with graphs" (PDF). Numerische Mathematik. 1: 269-271), which is also expressly incorporated by reference herein in its entirety for any purpose whatsoever.

In this formulation, let the node at which we are starting be called the initial node. Let the distance of node Y be the distance from the initial node to Y. Dijkstra's algorithm will assign some initial distance values and will try to improve them step by step.

First, assign to every node a tentative distance value: set it to zero for the initial node and to infinity for all other nodes.

Second, set the initial node as current. Mark all other nodes unvisited. Create a set of all the unvisited nodes called the unvisited set.

Third, for the current node, consider all of its neighbors and calculate their tentative distances. Compare the newly calculated tentative distance to the current assigned value and assign the smaller one. For example, if the current node A is marked with a distance of 6, and the edge connecting it with a neighbor B has length 2, then the distance to B (through A) will be 6+2=8. If B was previously marked with a distance greater than 8 then change it to 8. Otherwise, keep the current value.

Fourth, when done considering all of the neighbors of the current node, mark the current node as visited and remove it from the unvisited set. A visited node will not be checked again.

Fifth, if the destination node has been marked visited (when planning a route between two specific nodes) or if the smallest tentative distance among the nodes in the unvisited set is infinity (when planning a complete traversal; occurs when there is no connection between the initial node and remaining unvisited nodes), then stop. The algorithm has finished.

Sixth, otherwise, select the unvisited node that is marked with the smallest tentative distance, set it as the new "current node", and go back to the third step.

With further reference to FIG. 3, after computing "K" shortest paths, the shortest pathways and path lengths are determined within the graph database. The result is then outputted to the server, where the K path lengths are aggregated (e.g., via Equation 2 above), and the aggregate length is then transformed into a relevance score using Equation 3 above, for example.

Figure 2B:
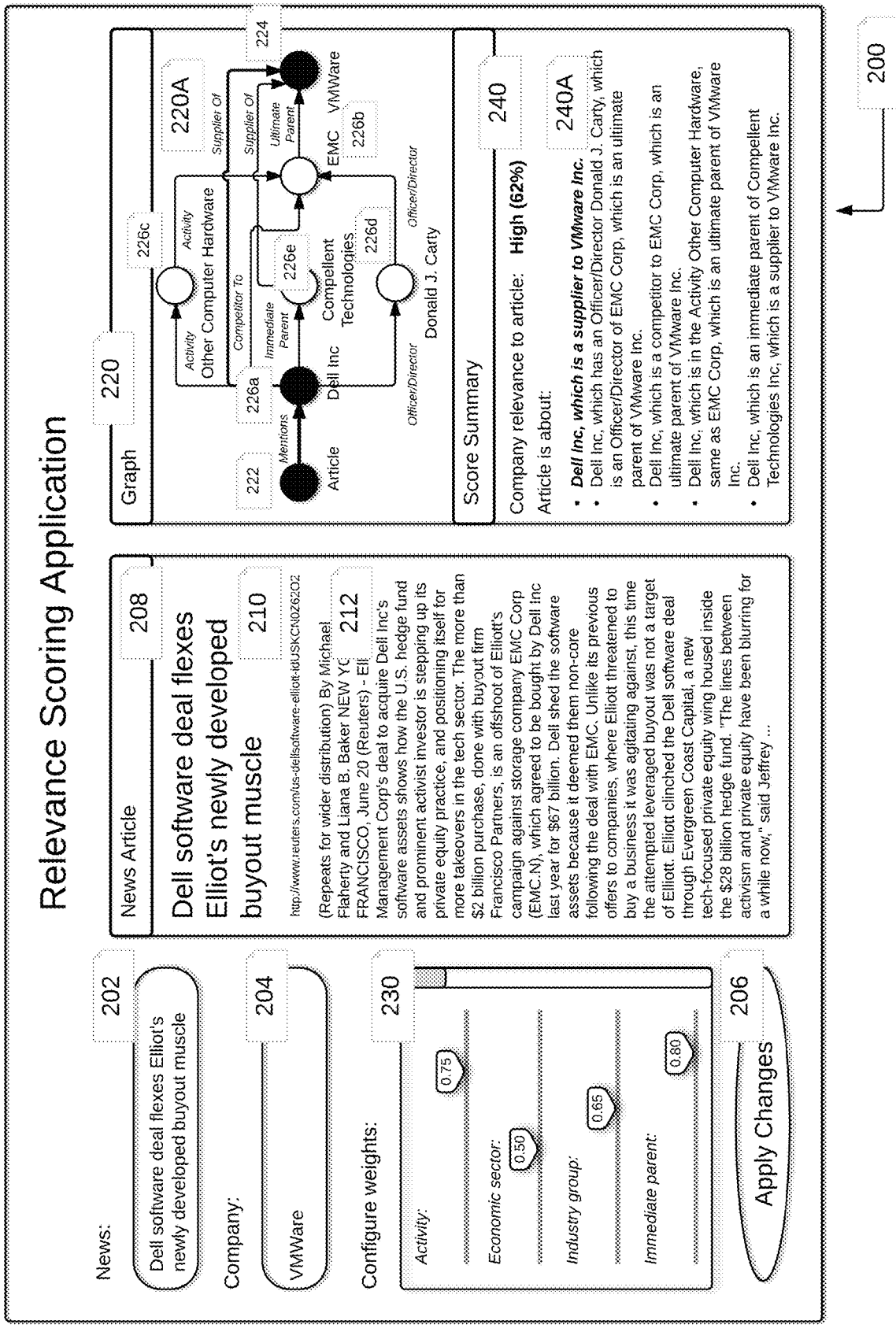
FIG. 2B shows a screen shot diagram illustrating a further aspect of the embodiment of FIG. 2A.
Figure 2C:
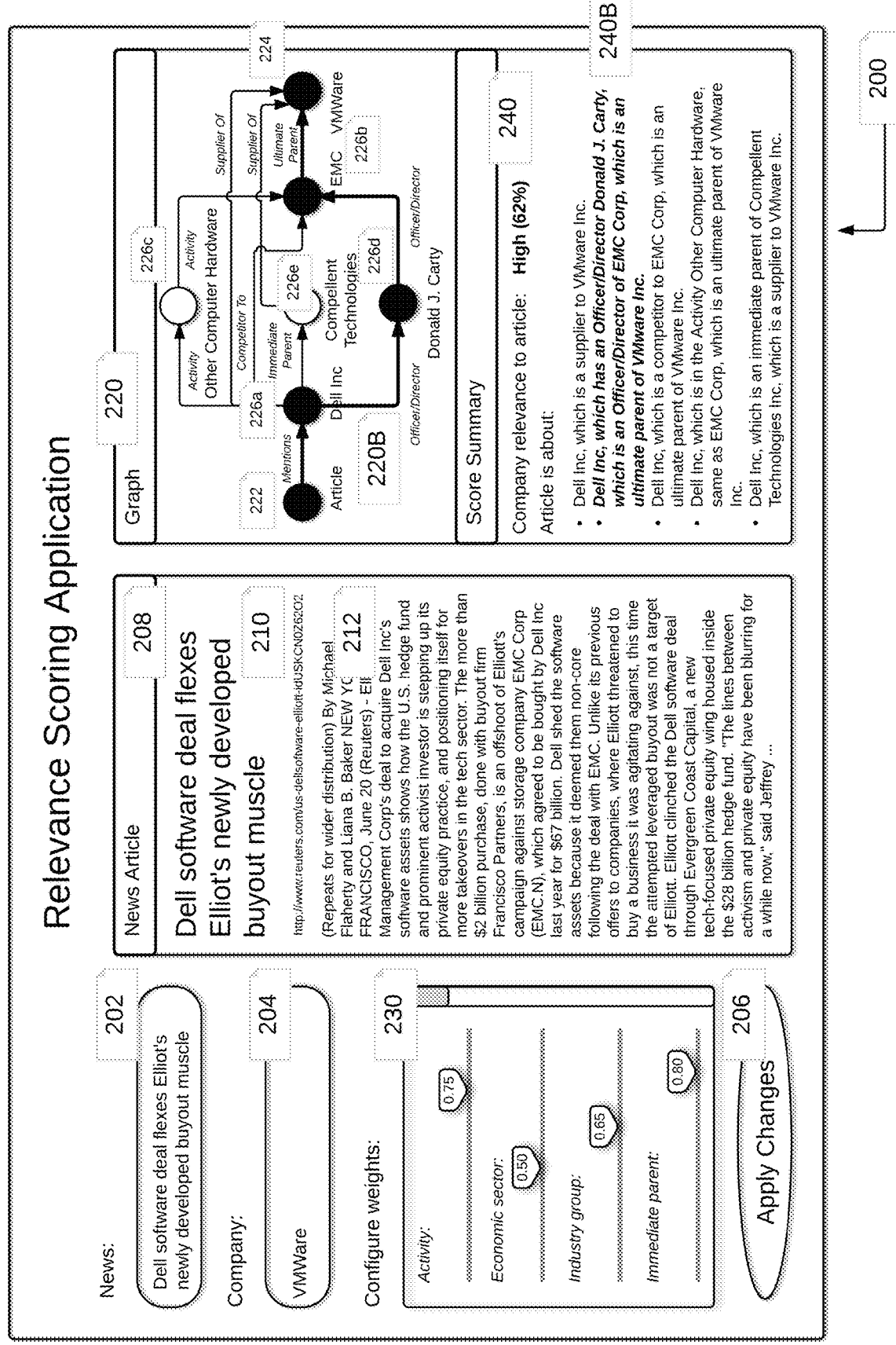
FIG. 2C shows a further screen shot diagram illustrating a further aspect of the embodiment of FIG. 2A.
Figure 2D:
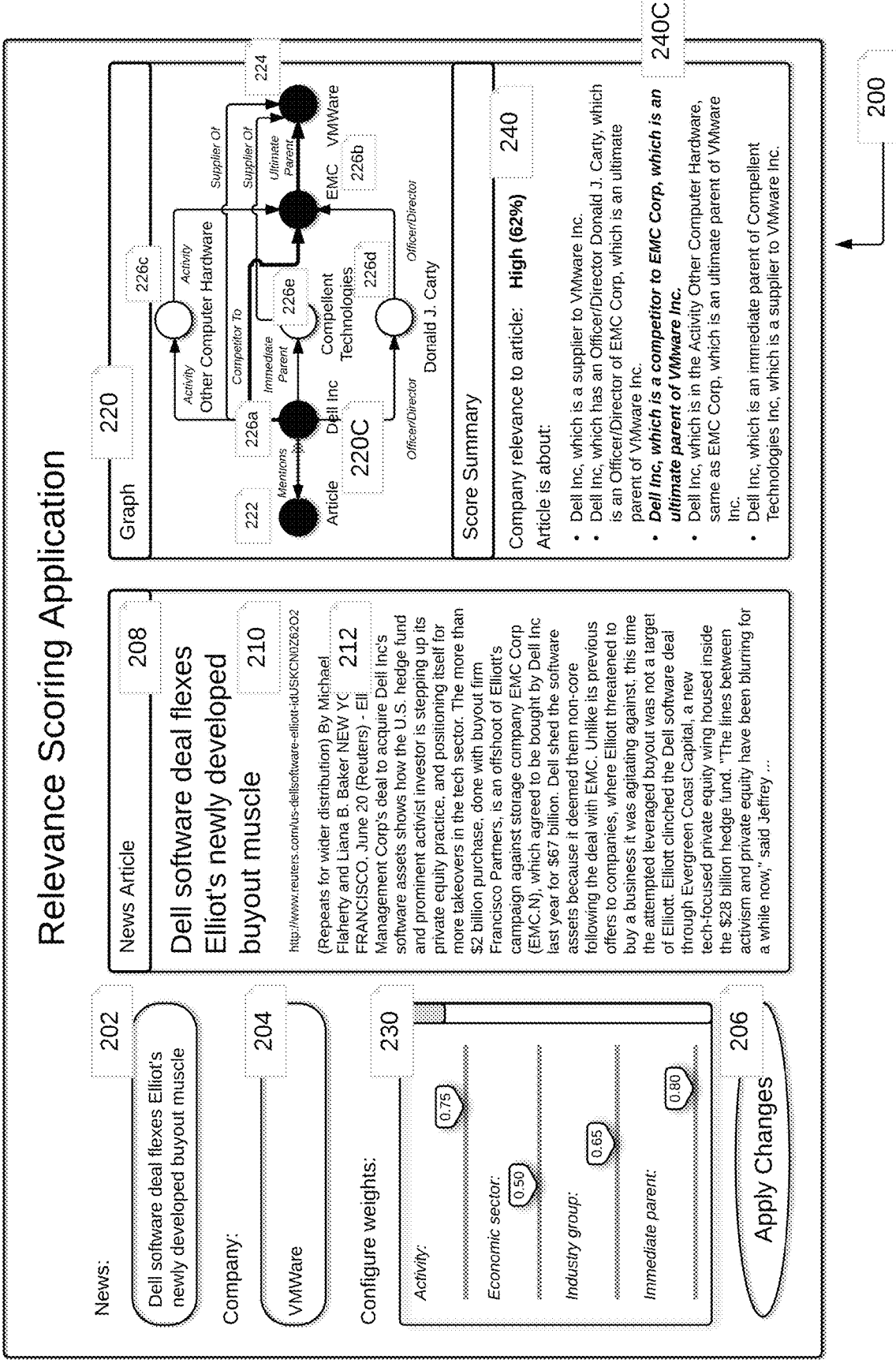
FIG. 2D shows a further screen shot diagram illustrating a further aspect of the embodiment of FIG. 2A.
Figure 2E:
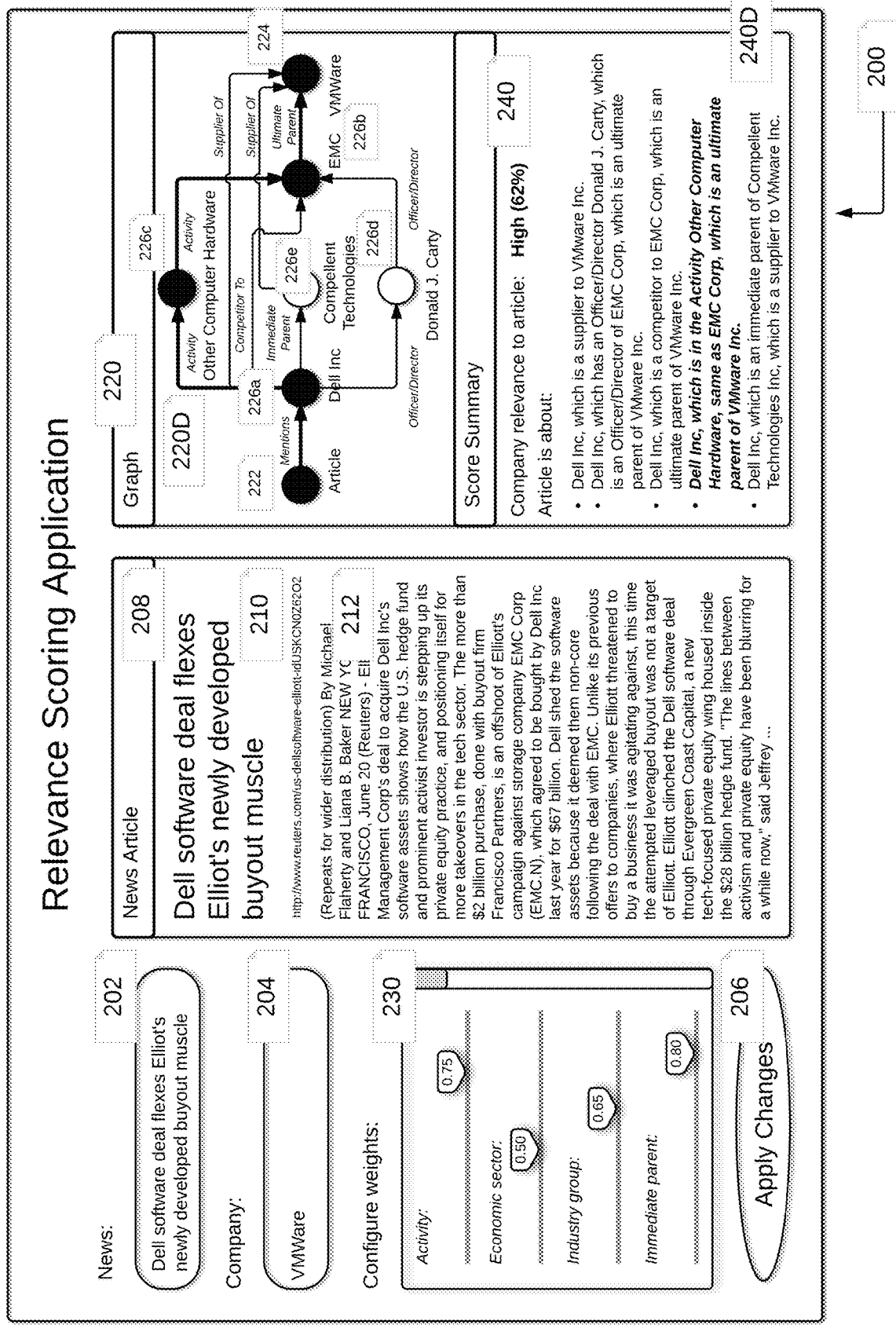
FIG. 2E shows a further screen shot diagram illustrating a further aspect of the embodiment of FIG. 2A.
Figure 2F:
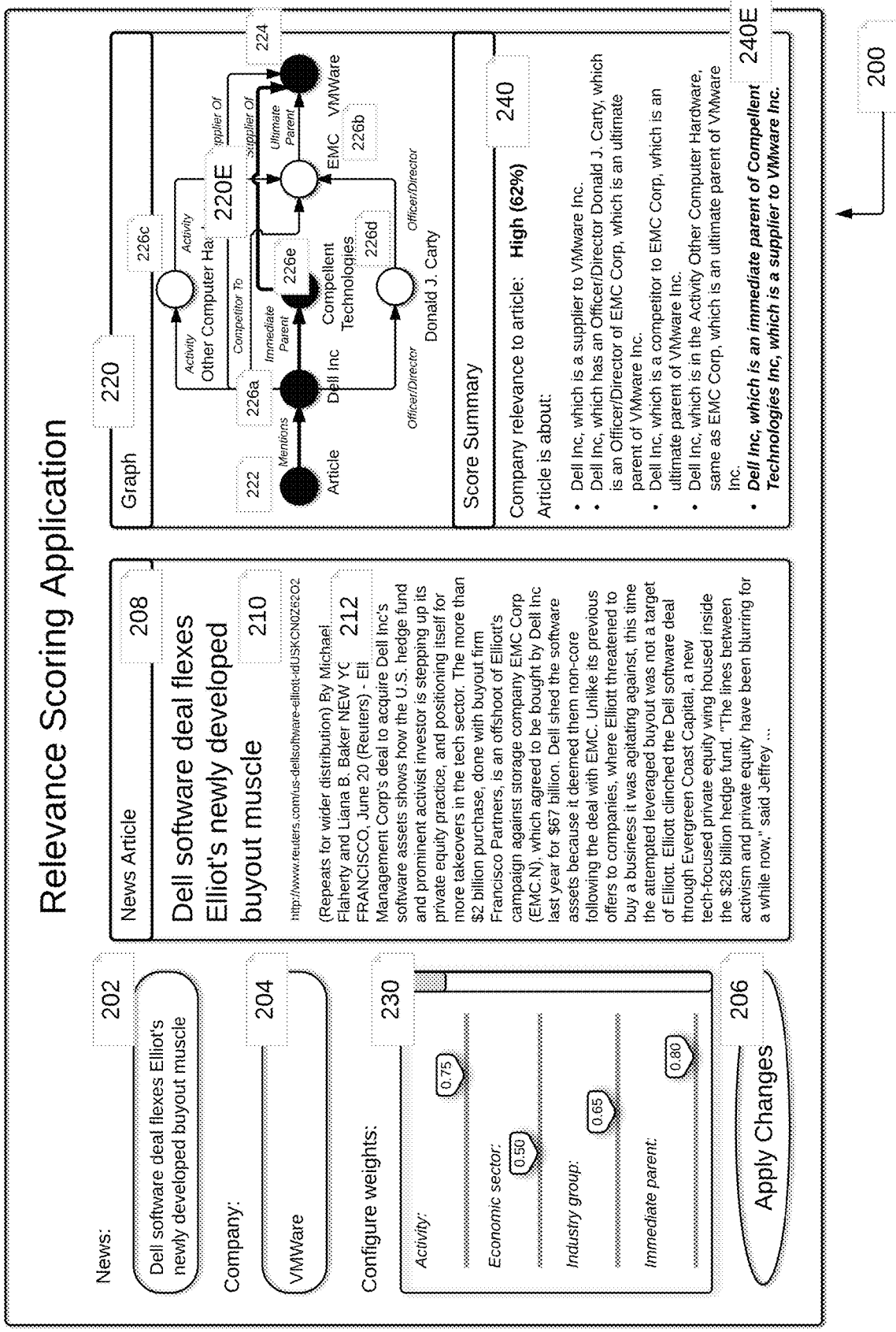
FIG. 2F shows a further screen shot diagram illustrating a further aspect of the embodiment of FIG. 2A.
Figure 2G:
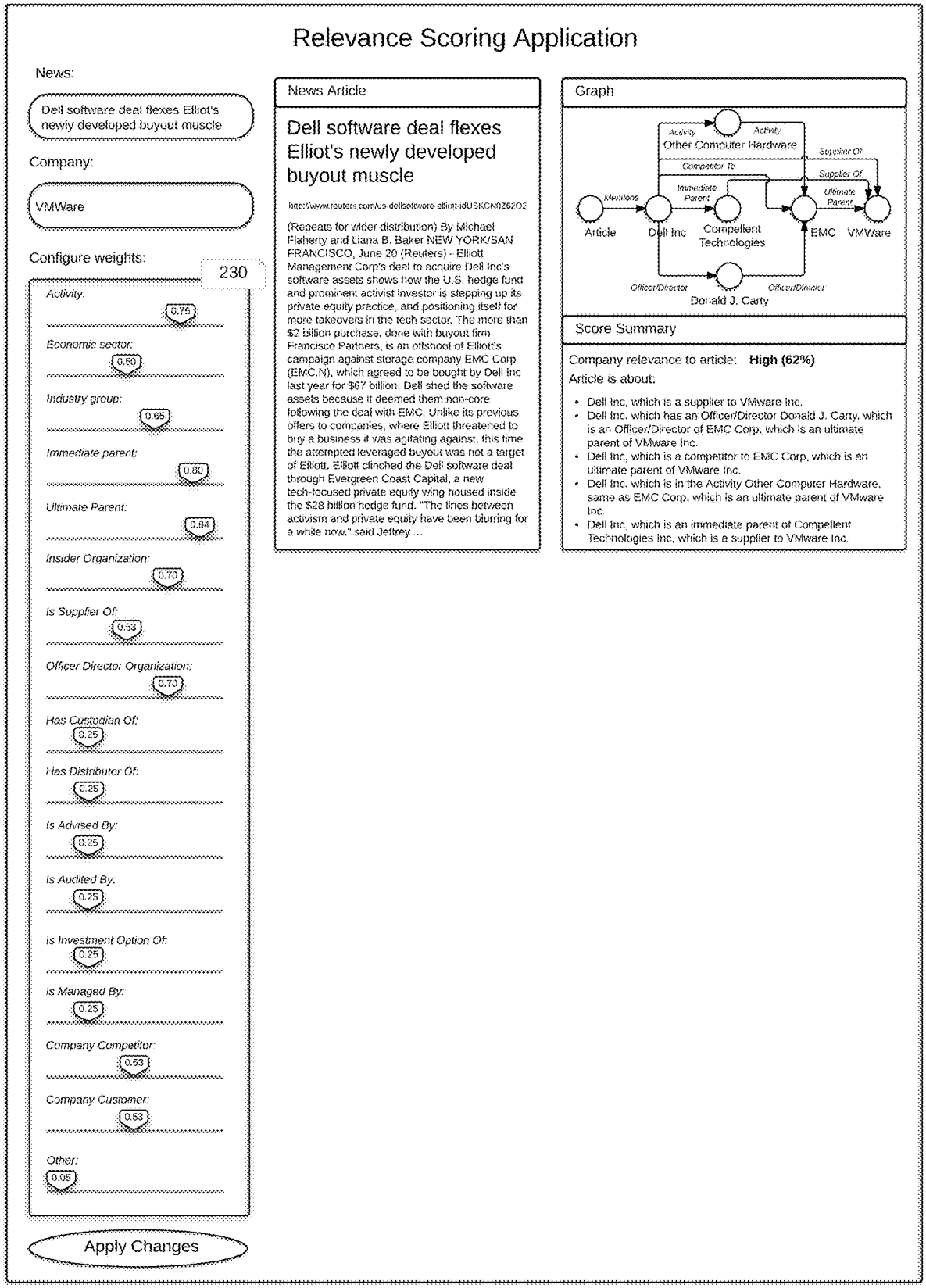
FIG. 2G shows a further screenshot diagram illustrating a weighting factor interface.
Figure 2H:
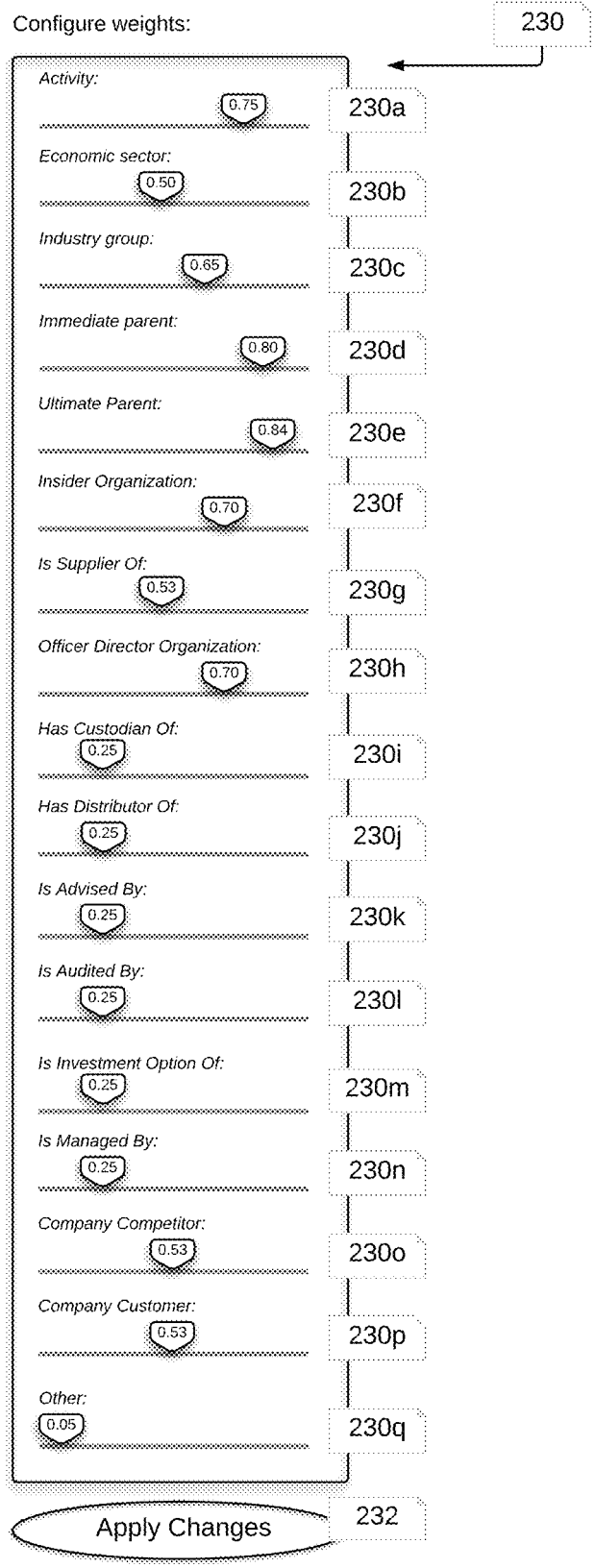
FIG. 2H shows an enlarged view of the weighting factor interface of FIG. 2G.
Figure 21:
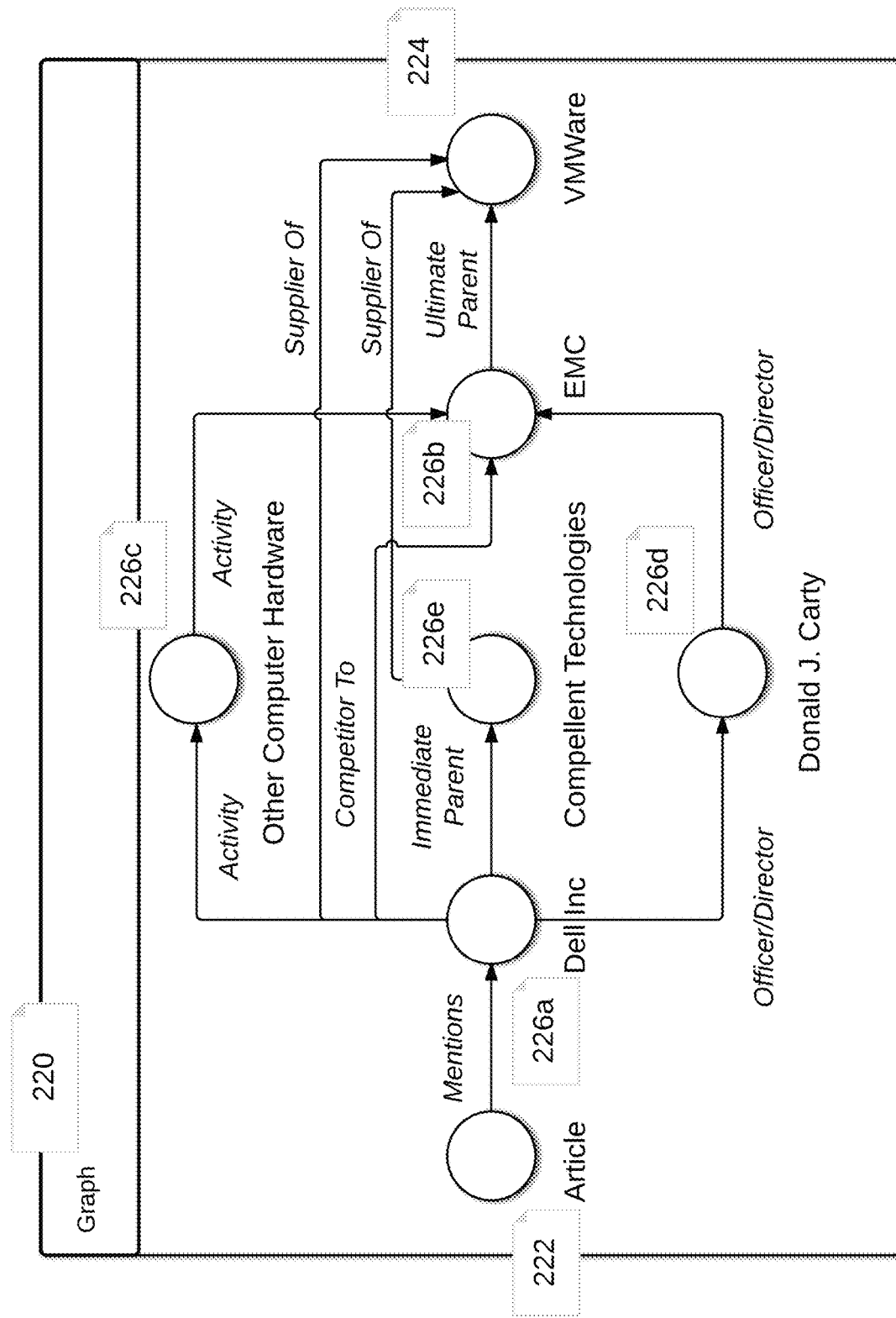

Next the path lengths are transformed into the natural language sentences summarizing each path for display in window 240 (e.g., FIG. 2B). This can be accomplished using any suitable rules-based method. A rules-based method will consider the nodes as nouns and the edges in the graph as verbs, and form natural language sentences by combining these nouns and verbs in a grammatical way, based on rules specified in a configuration file. At this point, the outputs of path lengths, relevance scores, and descriptive sentences are outputted to the client machine. The client machine then generates a graphical representation of the nodes and relationships in window 220 with the corresponding natural language sentences in window 240. If desired, as set forth above, the user can select sentences and the GUI toggles the display to highlight corresponding pathways, or vice-versa.

DETAILED DESCRIPTION OF THE COORDINATOR

Figure 4:
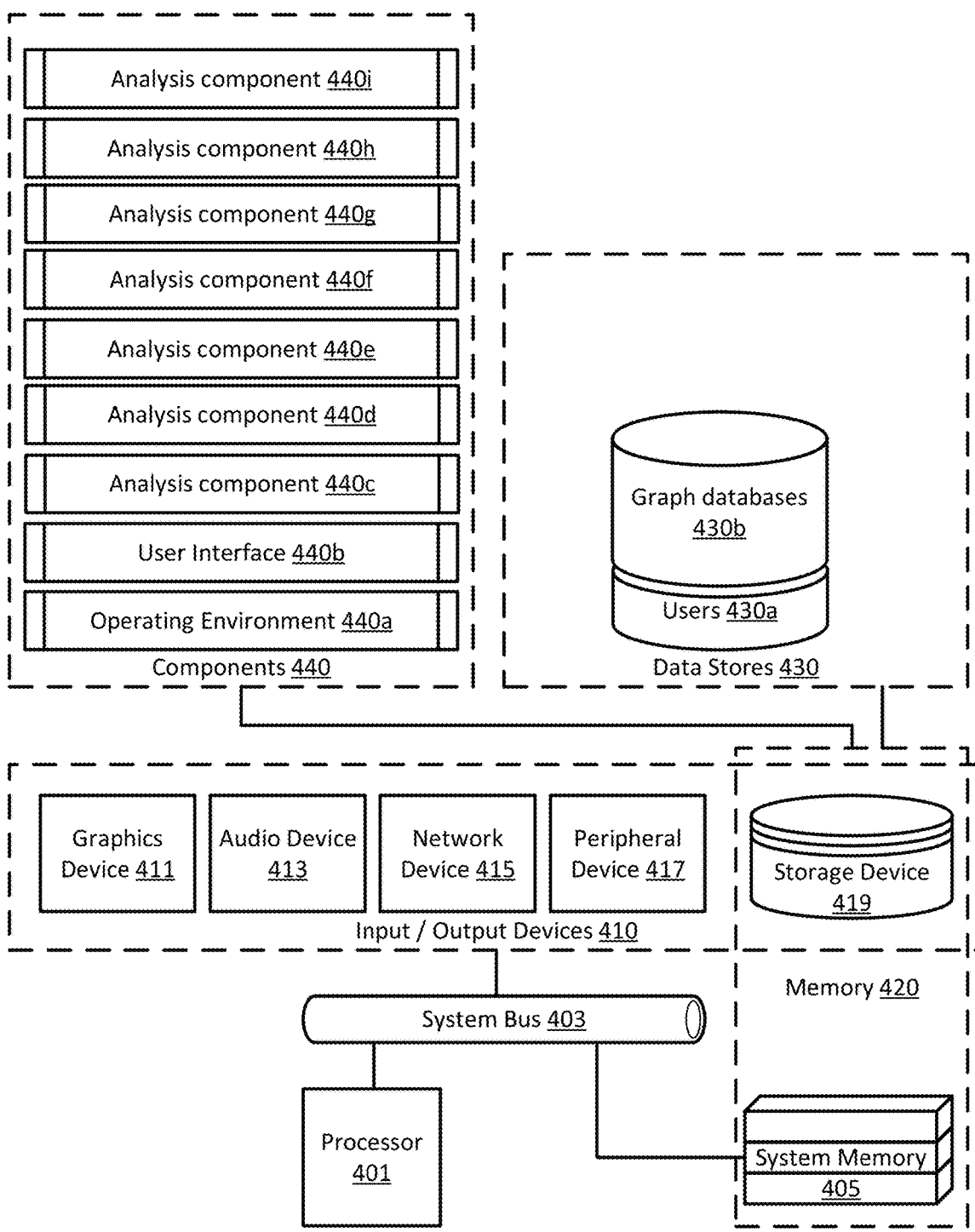
FIG. 4 shows a block diagram illustrating an exemplary system coordinator in one embodiment of the disclosure.

FIG. 4 shows a block diagram illustrating an exemplary coordinator in one embodiment of the disclosed embodiments. The coordinator facilitates the operation of the disclosed embodiments via a computer system (e.g., one or more cloud computing systems, grid computing systems, virtualized computer systems, mainframe computers, servers, clients, nodes, desktops, mobile devices such as smart phones, cellular phones, tablets, personal digital assistants (PDAs), and/or the like, embedded computers, dedicated computers, a system on a chip (SOC)). For example, the coordinator may receive, obtain, aggregate, process, generate, store, retrieve, send, delete, input, output, and/or the like data (including program data and program instructions); may execute program instructions; may communicate with computer systems, with nodes, with users, and/or the like. In various embodiments, the coordinator may comprise a standalone computer system, a distributed computer system, a node in a computer network (i.e., a network of computer systems organized in a topology), a network of coordinators, and/or the like. It is to be understood that the coordinator and/or the various coordinator elements (e.g., processor, system bus, memory, input/output devices) may be organized in any number of ways (i.e., using any number and configuration of computer systems, computer networks, nodes, coordinator elements, and/or the like) to facilitate operation. Furthermore, it is to be understood that the various coordinator computer systems, coordinator computer networks, coordinator nodes, coordinator elements, and/or the like may communicate among each other in any number of ways to facilitate operation. As used in this disclosure, the term "user" refers generally to people and/or computer systems that interact with the; the term "server" refers generally to a computer system, a program, and/or a combination thereof that handles requests and/or responds to requests from clients via a computer network; the term "client" refers generally to a computer system, a program, a user, and/or a combination thereof that generates requests and/or handles responses from servers via a computer network; outside of the context of a graph database the term "node" refers generally to a server, to a client, and/or to an intermediary computer system, program, and/or a combination thereof that facilitates transmission of and/or handling of requests and/or responses.

The coordinator includes a processor 401 that executes program instructions. In various embodiments, the processor may be a general purpose microprocessor (e.g., a central processing unit (CPU)), a dedicated microprocessor (e.g., a graphics processing unit (GPU), a physics processing unit (PPU), a digital signal processor (DSP), a network processor, and/or the like), an external processor, a plurality of processors (e.g., working in parallel, distributed, and/or the like), a microcontroller (e.g., for an embedded system), and/or the like. The processor may be implemented using integrated circuits (ICs), application-specific integrated circuits (ASICs), field-programmable gate arrays (FPGAs), and/or the like. In various implementations, the processor may comprise one or more cores, may include embedded elements (e.g., a coprocessor such as a math coprocessor, a cryptographic coprocessor, a physics coprocessor, and/or the like, registers, cache memory, software), may be synchronous (e.g., using a clock signal) or asynchronous (e.g., without a central clock), and/or the like. For example, the processor may be an AMD FX processor, an AMD Opteron processor, an AMD Geode LX processor, an Intel Core i7 processor, an Intel Xeon processor, an Intel Atom processor, an ARM Cortex processor, an IBM PowerPC processor, and/or the like.

The processor may be connected to system memory 405 via a system bus 403. The system bus may interconnect these and/or other elements of the coordinator via electrical, electronic, optical, wireless, and/or the like communication links (e.g., the system bus may be integrated into a motherboard that interconnects coordinator elements and provides power from a power supply). In various embodiments, the system bus may comprise one or more control buses, address buses, data buses, memory buses, peripheral buses, and/or the like. In various implementations, the system bus may be a parallel bus, a serial bus, a daisy chain design, a hub design, and/or the like. For example, the system bus may comprise a front-side bus, a back-side bus, AMD's HyperTransport, Intel's QuickPath Interconnect, a peripheral component interconnect (PCI) bus, an accelerated graphics port (AGP) bus, a PCI Express bus, a low pin count (LPC) bus, a universal serial bus (USB), and/or the like. The system memory, in various embodiments, may comprise registers, cache memory (e.g., level one, level two, level three), read only memory (ROM) (e.g., BIOS, flash memory), random access memory (RAM) (e.g., static RAM (SRAM), dynamic RAM (DRAM), error-correcting code (ECC) memory), and/or the like. The system memory may be discreet, external, embedded, integrated into a CPU, and/or the like. The processor may access, read from, write to, store in, erase, modify, and/or the like, the system memory in accordance with program instructions executed by the processor. The system memory may facilitate accessing, storing, retrieving, modifying, deleting, and/or the like data by the processor.

In various embodiments, input/output devices 410 may be connected to the processor and/or to the system memory, and/or to one another via the system bus.

In some embodiments, the input/output devices may include one or more graphics devices 411. The processor may make use of the one or more graphic devices in accordance with program instructions executed by the processor. In one implementation, a graphics device may be a video card that may obtain (e.g., via a connected video camera), process (e.g., render a frame), output (e.g., via a connected monitor, television, and/or the like), and/or the like graphical (e.g., multimedia, video, image, text) data. A video card may be connected to the system bus via an interface such as PCI, AGP, PCI Express, USB, PC Card, ExpressCard, and/or the like. A video card may use one or more graphics processing units (GPUs), for example, by utilizing AMD's CrossFireX and/or NVIDIA's SLI technologies. A video card may be connected via an interface (e.g., video graphics array (VGA), digital video interface (DVI), Mini-DVI, Micro-DVI, high-definition multimedia interface (HDMI), DisplayPort, Thunderbolt, composite video, S-Video, component video, and/or the like) to one or more displays (e.g., cathode ray tube (CRT), liquid crystal display (LCD), touchscreen, and/or the like) that display graphics. For example, a video card may be an AMD Radeon HD 6990, an ATI Mobility Radeon HD 5870, an AMD FirePro V9800P, an AMD Radeon E6760 MXM V3.0 Module, an NVIDIA GeForce GTX 590, an NVIDIA GeForce GTX 580M, an Intel HD Graphics 3000, and/or the like. In another implementation, a graphics device may be a video capture board that may obtain (e.g., via coaxial cable), process (e.g., overlay with other graphical data), capture, convert (e.g., between different formats, such as MPEG2 to H.264), and/or the like graphical data. A video capture board may be and/or include a TV tuner, may be compatible with a variety of broadcast signals (e.g., NTSC, PAL, ATSC, QAM) may be a part of a video card, and/or the like. For example, a video capture board may be an ATI All-in-Wonder HD, a Hauppauge ImpactVBR 01381, a Hauppauge WinTV-HVR-2250, a Hauppauge Colossus 01414, and/or the like. A graphics device may be discreet, external, embedded, integrated into a CPU, and/or the like. A graphics device may operate in combination with other graphics devices (e.g., in parallel) to provide improved capabilities, data throughput, color depth, and/or the like.

In some embodiments, the input/output devices may include one or more audio devices 413. The processor may make use of the one or more audio devices in accordance with program instructions executed by the processor. In one implementation, an audio device may be a sound card that may obtain (e.g., via a connected microphone), process, output (e.g., via connected speakers), and/or the like audio data. A sound card may be connected to the system bus via an interface such as PCI, PCI Express, USB, PC Card, ExpressCard, and/or the like. A sound card may be connected via an interface (e.g., tip sleeve (TS), tip ring sleeve (TRS), RCA, TOSLINK, optical) to one or more amplifiers, speakers (e.g., mono, stereo, surround sound), subwoofers, digital musical instruments, and/or the like. For example, a sound card may be an Intel AC'97 integrated codec chip, an Intel HD Audio integrated codec chip, a Creative Sound Blaster X-Fi Titanium HD, a Creative Sound Blaster X-Fi Go! Pro, a Creative Sound Blaster Recon 3D, a Turtle Beach Riviera, a Turtle Beach Amigo II, and/or the like. An audio device may be discreet, external, embedded, integrated into a motherboard, and/or the like. An audio device may operate in combination with other audio devices (e.g., in parallel) to provide improved capabilities, data throughput, audio quality, and/or the like.

In some embodiments, the input/output devices may include one or more network devices 415. The processor may make use of the one or more network devices in accordance with program instructions executed by the processor. In one implementation, a network device may be a network card that may obtain (e.g., via a Category 5 Ethernet cable), process, output (e.g., via a wireless antenna), and/or the like network data. A network card may be connected to the system bus via an interface such as PCI, PCI Express, USB, FireWire, PC Card, ExpressCard, and/or the like. A network card may be a wired network card (e.g., 10/100/1000, optical fiber), a wireless network card (e.g., Wi-Fi 802.11a/b/g/n/ac/ad, Bluetooth, Near Field Communication (NFC), TransferJet), a modem (e.g., dialup telephone-based, asymmetric digital subscriber line (ADSL), cable modem, power line modem, wireless modem based on cellular protocols such as high speed packet access (HSPA), evolution-data optimized (EV-DO), global system for mobile communications (GSM), worldwide interoperability for microwave access (WiMax), long term evolution (LTE), and/or the like, satellite modem, FM radio modem, radio-frequency identification (RFID) modem, infrared (IR) modem), and/or the like. For example, a network card may be an Intel EXPI9301CT, an Intel EXPI9402PT, a LINKSYS USB300M, a BUFFALO WLI-UC-G450, a Rosewill RNX-MiniN1, a TRENDnet TEW-623PI, a Rosewill RNX-N180UBE, an ASUS USB-BT211, a MOTOROLA SB6120, a U.S. Robotics USR5686G, a Zoom 5697-00-00F, a TRENDnet TPL-401E2K, a D-Link DHP-W306AV, a StarTech ET91000SC, a Broadcom BCM20791, a Broadcom InConcert BCM4330, a Broadcom BCM4360, an LG VL600, a Qualcomm MDM9600, a Toshiba TC35420 TransferJet device, and/or the like. A network device may be discreet, external, embedded, integrated into a motherboard, and/or the like. A network device may operate in combination with other network devices (e.g., in parallel) to provide improved data throughput, redundancy, and/or the like. For example, protocols such as link aggregation control protocol (LACP) based on IEEE 802.3AD-2000 or IEEE 802.1AX-2008 standards may be used. A network device may be used to connect to a local area network (LAN), a wide area network (WAN), a metropolitan area network (MAN), a personal area network, the Internet, an intranet, a Bluetooth network, an NFC network, a Wi-Fi network, a cellular network, and/or the like.

In some embodiments, the input/output devices may include one or more peripheral devices 417. The processor may make use of the one or more peripheral devices in accordance with program instructions executed by the processor. In various implementations, a peripheral device may be a digital camera, a video camera, a webcam, an electronically moveable pan tilt zoom (PTZ) camera, a monitor, a touchscreen display, active shutter 3D glasses, head-tracking 3D glasses, a remote control, an audio line-in, an audio line-out, a microphone, headphones, speakers, a subwoofer, a router, a hub, a switch, a firewall, an antenna, a keyboard, a mouse, a trackpad, a trackball, a digitizing tablet, a stylus, a joystick, a gamepad, a game controller, a force-feedback device, a laser, sensors (e.g., proximity sensor, rangefinder, ambient temperature sensor, ambient light sensor, humidity sensor, an accelerometer, a gyroscope, a motion sensor, an olfaction sensor, a biosensor, a chemical sensor, a magnetometer, a radar, a sonar, a location sensor such as global positioning system (GPS), Galileo, GLONASS, and/or the like), a printer, a fax, a scanner, a copier, a card reader, and/or the like. A peripheral device may be connected to the system bus via an interface such as PCI, PCI Express, USB, FireWire, VGA, DVI, Mini-DVI, Micro-DVI, HDMI, DisplayPort, Thunderbolt, composite video, S-Video, component video, PC Card, ExpressCard, serial port, parallel port, PS/2, TS, TRS, RCA, TOSLINK, network connection (e.g., wired such as Ethernet, optical fiber, and/or the like, wireless such as Wi-Fi, Bluetooth, NFC, cellular, and/or the like), a connector of another input/output device, and/or the like. A peripheral device may be discreet, external, embedded, integrated (e.g., into a processor, into a motherboard), and/or the like. A peripheral device may operate in combination with other peripheral devices (e.g., in parallel) to provide the TRAILBLAZER coordinator with a variety of input, output and processing capabilities.

In some embodiments, the input/output devices may include one or more storage devices 419. The processor may access, read from, write to, store in, erase, modify, and/or the like a storage device in accordance with program instructions executed by the processor. A storage device may facilitate accessing, storing, retrieving, modifying, deleting, and/or the like data (e.g., graph database data as described elsewhere herein) by the processor. In one implementation, the processor may access data from the storage device directly via the system bus. In another implementation, the processor may access data from the storage device by instructing the storage device to transfer the data to the system memory and accessing the data from the system memory. In various embodiments, a storage device may be a hard disk drive (HDD), a solid-state drive (SSD), a floppy drive using diskettes, an optical disk drive (e.g., compact disk (CD-ROM) drive, CD-Recordable (CD-R) drive, CD-Rewriteable (CD-RW) drive, digital versatile disc (DVD-ROM) drive, DVD-R drive, DVD-RW drive, Blu-ray disk (BD) drive) using an optical medium, a magnetic tape drive using a magnetic tape, a memory card (e.g., a USB flash drive, a compact flash (CF) card, a secure digital extended capacity (SDXC) card), a network attached storage (NAS), a direct-attached storage (DAS), a storage area network (SAN), other processor-readable physical mediums, and/or the like. A storage device may be connected to the system bus via an interface such as PCI, PCI Express, USB, FireWire, PC Card, ExpressCard, integrated drive electronics (IDE), serial advanced technology attachment (SATA), external SATA (eSATA), small computer system interface (SCSI), serial attached SCSI (SAS), fibre channel (FC), network connection (e.g., wired such as Ethernet, optical fiber, and/or the like; wireless such as Wi-Fi, Bluetooth, NFC, cellular, and/or the like), and/or the like. A storage device may be discreet, external, embedded, integrated (e.g., into a motherboard, into another storage device), and/or the like. A storage device may operate in combination with other storage devices to provide improved capacity, data throughput, data redundancy, and/or the like. For example, protocols such as redundant array of independent disks (RAID) (e.g., RAID 0 (striping), RAID 1 (mirroring), RAID 5 (striping with distributed parity), hybrid RAID), just a bunch of drives (JBOD), and/or the like may be used. In another example, virtual and/or physical drives may be pooled to create a storage pool. In yet another example, an SSD cache may be used with a HDD to improve speed.

Together and/or separately the system memory 405 and the one or more storage devices 419 may be referred to as memory 420 (i.e., physical memory).

Memory 420 contains processor-operable (e.g., accessible) data stores 430. Data stores 430 comprise data that may be used via the coordinator. Such data may be organized using one or more data formats such as one or more of a database (e.g., a relational database with database tables, an object-oriented database, a graph database, a hierarchical database), a flat file (e.g., organized into a tabular format), a binary file (e.g., a GIF file, an MPEG-4 file), a structured file (e.g., an HTML file, an XML file), a text file, and/or the like. Furthermore, data may be organized using one or more data structures such as an array, a queue, a stack, a set, a linked list, a map, a tree, a hash, a record, an object, a directed graph, and/or the like. In various embodiments, data stores may be organized in any number of ways (i.e., using any number and configuration of data formats, data structures, coordinator elements, and/or the like) to facilitate operation. For example, data stores may comprise data stores 430a-n implemented as one or more (e.g., graph) databases. A users data store 430a may be a collection of database tables that include fields such as UserID, UserName, UserPreferences, and/or the like. A graph database data store 430b may be a collection of graph databases.

System memory 420 contains processor-operable (e.g., executable) components 440. Components 440 comprise program components (including program instructions and any associated data stores) that are executed via the coordinator (i.e., via the processor) to transform inputs into outputs. It is to be understood that the various components and their subcomponents, capabilities, applications, and/or the like may be organized in any number of ways (i.e., using any number and configuration of components, subcomponents, capabilities, applications, coordinator elements, and/or the like) to facilitate operation. Furthermore, it is to be understood that the various components and their subcomponents, capabilities, applications, and/or the like may communicate among each other in any number of ways to facilitate operation. For example, the various components and their subcomponents, capabilities, applications, and/or the like may be combined, integrated, consolidated, split up, distributed, and/or the like in any number of ways to facilitate operation. In another example, a single or multiple instances of the various components and their subcomponents, capabilities, applications, and/or the like may be instantiated on each of a single coordinator node, across multiple coordinator nodes, and/or the like.

In various embodiments, program components may be developed using one or more programming languages, techniques, tools, and/or the like such as an assembly language, Ada, BASIC, C, C++, C#, COBOL, Fortran, Java, LabVIEW, Lisp, Mathematica, MATLAB, OCaml, PL/I, Smalltalk, Visual Basic for Applications (VBA), HTML, XML, CSS, JavaScript, JavaScript Object Notation (JSON), PHP, Perl, Ruby, Python, Asynchronous JavaScript and XML (AJAX), WebSocket Protocol, Simple Object Access Protocol (SOAP), SSL, ColdFusion, Microsoft .NET, Apache modules, Adobe Flash, Adobe AIR, Microsoft Silverlight, Windows PowerShell, batch files, Tcl, graphical user interface (GUI) toolkits, SQL, database adapters, web application programming interfaces (APIs), application server extensions, integrated development environments (IDEs), libraries (e.g., object libraries, class libraries, remote libraries), remote procedure calls (RPCs), Common Object Request Broker Architecture (CORBA), and/or the like.

In some embodiments, components 440 may include an operating environment component 440a. The operating environment component may facilitate operation of the system via various subcomponents. In some implementations, the operating environment component may include an operating system subcomponent. The operating system subcomponent may provide an abstraction layer that facilitates the use of, communication among, common services for, interaction with, security of, and/or the like of various coordinator elements, components, data stores, and/or the like.

In some embodiments, the operating system subcomponent may facilitate execution of program instructions by the processor by providing process management capabilities. For example, the operating system subcomponent may facilitate the use of multiple processors, the execution of multiple processes, multitasking, and/or the like.

In some embodiments, the operating system subcomponent may facilitate the use of memory by the system. For example, the operating system subcomponent may allocate and/or free memory, facilitate memory addressing, provide memory segmentation and/or protection, provide virtual memory capability, facilitate caching, and/or the like. In another example, the operating system subcomponent may include a file system (e.g., File Allocation Table (FAT), New Technology File System (NTFS), Hierarchical File System Plus (HFS+), Universal Disk Format (UDF), Linear Tape File System (LTFS)) to facilitate storage, retrieval, deletion, aggregation, processing, generation, and/or the like of data.

In some embodiments, the operating system subcomponent may facilitate operation of and/or processing of data for and/or from input/output devices. For example, the operating system subcomponent may include one or more device drivers, interrupt handlers, file systems, and/or the like that allow interaction with input/output devices.

In some embodiments, the operating system subcomponent may facilitate operation of the coordinator as a node in a computer network by providing support for one or more communications protocols. For example, the operating system subcomponent may include support for the internet protocol suite (i.e., Transmission Control Protocol/Internet Protocol (TCP/IP)) of network protocols such as TCP, IP, User Datagram Protocol (UDP), Mobile IP, and/or the like. In another example, the operating system subcomponent may include support for security protocols (e.g., Wired Equivalent Privacy (WEP), Wi-Fi Protected Access (WPA), WPA2) for wireless computer networks. In yet another example, the operating system subcomponent may include support for virtual private networks (VPNs).

In some embodiments, the operating system subcomponent may facilitate security of the coordinator. For example, the operating system subcomponent may provide services such as authentication, authorization, audit, network intrusion-detection capabilities, firewall capabilities, antivirus capabilities, and/or the like.

In some embodiments, the operating system subcomponent may facilitate user interaction with the system by providing user interface elements that may be used by the system to generate a user interface. In one implementation, such user interface elements may include widgets (e.g., windows, dialog boxes, scrollbars, menu bars, tabs, ribbons, menus, buttons, text boxes, checkboxes, combo boxes, dropdown lists, list boxes, radio buttons, sliders, spinners, grids, labels, progress indicators, icons, tooltips, and/or the like) that may be used to obtain input from and/or provide output to the user. For example, such widgets may be used via a widget toolkit such as Microsoft Foundation Classes (MFC), Apple Cocoa Touch, Java Swing, GTK+, Qt, Yahoo! User Interface Library (YUI), and/or the like. In another implementation, such user interface elements may include sounds (e.g., event notification sounds stored in MP3 file format), animations, vibrations, and/or the like that may be used to inform the user regarding occurrence of various events. For example, the operating system subcomponent may include a user interface such as Windows Aero, Mac OS X Aqua, GNOME Shell, KDE Plasma Workspaces (e.g., Plasma Desktop, Plasma Netbook, Plasma Contour, Plasma Mobile), and/or the like.

In various embodiments the operating system subcomponent may comprise a single-user operating system, a multi-user operating system, a single-tasking operating system, a multitasking operating system, a single-processor operating system, a multiprocessor operating system, a distributed operating system, an embedded operating system, a real-time operating system, and/or the like. For example, the operating system subcomponent may comprise an operating system such as UNIX, LINUX, IBM i, Sun Solaris, Microsoft Windows Server, Microsoft DOS, Microsoft Windows 7, Microsoft Windows 8, Apple Mac OS X, Apple iOS, Android, Symbian, Windows Phone 7, Windows Phone 8, Blackberry QNX, and/or the like.

In some implementations, the operating environment component may include a database subcomponent. The database subcomponent may facilitate TRAILBLAZER capabilities such as storage, analysis, retrieval, access, modification, deletion, aggregation, generation, and/or the like of data (e.g., the use of data stores 1130). The database subcomponent may make use of database languages (e.g., Structured Query Language (SQL), XQuery), stored procedures, triggers, APIs, and/or the like to provide these capabilities. In various embodiments the database subcomponent may comprise a cloud database, a data warehouse, a distributed database, an embedded database, a parallel database, a real-time database, and/or the like. For example, the database subcomponent may comprise a database such as Microsoft SQL Server, Microsoft Access, MySQL, IBM DB2, Oracle Database, Apache Cassandra database, and/or the like.

In some implementations, the operating environment component may include an information handling subcomponent. The information handling subcomponent may provide the system with capabilities to serve, deliver, upload, obtain, present, download, and/or the like a variety of information. The information handling subcomponent may use protocols such as Hypertext Transfer Protocol (HTTP), Hypertext Transfer Protocol Secure (HTTPS), File Transfer Protocol (FTP), Telnet, Secure Shell (SSH), Transport Layer Security (TLS), Secure Sockets Layer (SSL), peer-to-peer (P2P) protocols (e.g., BitTorrent), and/or the like to handle communication of information such as web pages, files, multimedia content (e.g., streaming media), applications, and/or the like.

In some embodiments, the information handling subcomponent may facilitate the serving of information to users, system components, nodes in a computer network, web browsers, and/or the like. For example, the information handling subcomponent may comprise a web server such as Apache HTTP Server, Microsoft Internet Information Services (IIS), Oracle WebLogic Server, Adobe Flash Media Server, Adobe Content Server, and/or the like. Furthermore, a web server may include extensions, plug-ins, add-ons, servlets, and/or the like. For example, these may include Apache modules, IIS extensions, Java servlets, and/or the like. In some implementations, the information handling subcomponent may communicate with the database subcomponent via standards such as Open Database Connectivity (ODBC), Java Database Connectivity (JDBC), ActiveX Data Objects for .NET (ADO.NET), and/or the like. For example, the information handling subcomponent may use such standards to store, analyze, retrieve, access, modify, delete, aggregate, generate, and/or the like data (e.g., data from data stores 1130) via the database subcomponent.

In some embodiments, the information handling subcomponent may facilitate presentation of information obtained from users, system components, nodes in a computer network, web servers, and/or the like. For example, the information handling subcomponent may comprise a web browser such as Microsoft Internet Explorer, Mozilla Firefox, Apple Safari, Google Chrome, Opera Mobile, Amazon Silk, Nintendo 3DS Internet Browser, and/or the like. Furthermore, a web browser may include extensions, plug-ins, add-ons, applets, and/or the like. For example, these may include Adobe Flash Player, Adobe Acrobat plug-in, Microsoft Silverlight plug-in, Microsoft Office plug-in, Java plug-in, and/or the like.

In some implementations, the operating environment component may include a messaging subcomponent. The messaging subcomponent may facilitate system message communications capabilities. The messaging subcomponent may use protocols such as Simple Mail Transfer Protocol (SMTP), Internet Message Access Protocol (IMAP), Post Office Protocol (POP), Extensible Messaging and Presence Protocol (XMPP), Real-time Transport Protocol (RTP), Internet Relay Chat (IRC), Skype protocol, AOL's Open System for Communication in Realtime (OSCAR), Messaging Application Programming Interface (MAPI), Facebook API, a custom protocol, and/or the like to facilitate system message communications. The messaging subcomponent may facilitate message communications such as email, instant messaging, Voice over IP (VoIP), video conferencing, Short Message Service (SMS), web chat, in-app messaging (e.g., alerts, notifications), and/or the like. For example, the messaging subcomponent may comprise Microsoft Exchange Server, Microsoft Outlook, Sendmail, IBM Lotus Domino, Gmail, AOL Instant Messenger (AIM), Yahoo Messenger, ICQ, Trillian, Skype, Google Talk, Apple FaceTime, Apple iChat, Facebook Chat, and/or the like.

In some implementations, the operating environment component may include a security subcomponent that facilitates system security. In some embodiments, the security subcomponent may restrict access to the system, to one or more services provided by the system, to data associated with the system (e.g., stored in data stores 430), to communication messages associated with the system, and/or the like to authorized users. Access may be granted via a login screen, via an API that obtains authentication information, via an authentication token, and/or the like. For example, the user may obtain access by providing a username and/or a password (e.g., a string of characters, a picture password), a personal identification number (PIN), an identification card, a magnetic stripe card, a smart card, a biometric identifier (e.g., a finger print, a voice print, a retina scan, a face scan), a gesture (e.g., a swipe), a media access control (MAC) address, an IP address, and/or the like. Various security models such as access-control lists (ACLs), capability-based security, hierarchical protection domains, and/or the like may be used to control access. For example, the security subcomponent may facilitate digital rights management (DRM), network intrusion detection, firewall capabilities, and/or the like.

In some embodiments, the security subcomponent may use cryptographic techniques to secure information (e.g., by storing encrypted data), verify message authentication (e.g., via a digital signature), provide integrity checking (e.g., a checksum), and/or the like by facilitating encryption and/or decryption of data. Furthermore, steganographic techniques may be used instead of or in combination with cryptographic techniques. Cryptographic techniques used by the system may include symmetric key cryptography using shared keys (e.g., using one or more block ciphers such as triple Data Encryption Standard (DES), Advanced Encryption Standard (AES); stream ciphers such as Rivest Cipher 4 (RC4), Rabbit), asymmetric key cryptography using a public key/private key pair (e.g., using algorithms such as Rivest-Shamir-Adleman (RSA), Digital Signature Algorithm (DSA)), cryptographic hash functions (e.g., using algorithms such as Message-Digest 5 (MD5), Secure Hash Algorithm 2 (SHA-2)), and/or the like. For example, the security subcomponent may comprise a cryptographic system such as Pretty Good Privacy (PGP).

In some implementations, the operating environment component may include a virtualization subcomponent that facilitates system virtualization capabilities. In some embodiments, the virtualization subcomponent may provide support for platform virtualization (e.g., via a virtual machine). Platform virtualization types may include full virtualization, partial virtualization, paravirtualization, and/or the like. In some implementations, platform virtualization may be hardware-assisted (e.g., via support from the processor using technologies such as AMD-V, Intel VT-x, and/or the like). In some embodiments, the virtualization subcomponent may provide support for various other virtualized environments such as via operating-system level virtualization, desktop virtualization, workspace virtualization, mobile virtualization, application virtualization, database virtualization, and/or the like. In some embodiments, the virtualization subcomponent may provide support for various virtualized resources such as via memory virtualization, storage virtualization, data virtualization, network virtualization, and/or the like. For example, the virtualization subcomponent may comprise VMware software suite (e.g., VMware Server, VMware Workstation, VMware Player, VMware ESX, VMware ESXi, VMware ThinApp, VMware Infrastructure), Parallels software suite (e.g., Parallels Server, Parallels Workstation, Parallels Desktop, Parallels Mobile, Parallels Virtuozzo Containers), Oracle software suite (e.g., Oracle VM Server for SPARC, Oracle VM Server for x86, Oracle VM VirtualBox, Oracle Solaris 10, Oracle Solaris 11), Informatica Data Services, Wine, and/or the like.

In some embodiments, components 440 may include a user interface component 1140b. The user interface component may facilitate user interaction with the system by providing a user interface. In various implementations, the user interface component may include programmatic instructions to obtain input from and/or provide output to the user via physical controls (e.g., physical buttons, switches, knobs, wheels, dials), textual user interface, audio user interface, GUI, voice recognition, gesture recognition, touch and/or multi-touch user interface, messages, APIs, and/or the like. In some implementations, the user interface component may make use of the user interface elements pro-vided by the operating system subcomponent of the operating environment component. For example, the user interface component may make use of the operating system subcomponent's user interface elements via a widget toolkit. In some implementations, the user interface component may make use of information presentation capabilities provided by the information handling subcomponent of the operating environment component. For example, the user interface component may make use of a web browser to provide a user interface via HTML5, Adobe Flash, Microsoft Silverlight, and/or the like.

As will be appreciated, the graph database analysis tools described herein can be incorporated into other software programs. In one embodiment, the tools can be incorporated into a an online financial portfolio portal system configured to generate and display a graphical user interface that presents a listing of a plurality of securities, each security relating to a company. The system further includes a news feed matching engine for matching a company in the portfolio to news stories, utilizing graph database analysis tools as set forth herein.

In order to address various issues and advance the art, the entirety of this application (including the Cover Page, Title, Headings, Field, Background, Summary, Brief Description of the Drawings, Detailed Description, Claims, Abstract, Figures, Appendices or otherwise) shows by way of illustration various embodiments in which the claimed innovations may be practiced. The advantages and features of the application are of a representative sample of embodiments only, and are not exhaustive or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural or topological modifications may be made without departing from the scope or spirit of the disclosure. As such, all examples or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical or topological structure of any combination of any program components (a component collection), other components or any present feature sets as described in the figures or throughout are not limited to a fixed operating order or arrangement, but rather, any disclosed order is exemplary and all equivalents, regardless of order, are contemplated by the disclosure. Furthermore, it is to be understood that such features are not limited to serial execution, but rather, any number of threads, processes, services, servers, or the like that may execute asynchronously, concurrently, in parallel, simultaneously, synchronously, or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations in part, divisions, or the like thereof. As such, it should be understood that advantages, embodiments, examples, functional, features, logical, operational, organizational, structural, topological, or other aspects of the disclosure are not to be considered limitations on the disclosure as defined by the claims or limitations on equivalents to the claims.

All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Descriptions herein of circuitry and method steps and computer programs represent conceptual embodiments of illustrative circuitry and software embodying the principles of the disclosed embodiments. Thus the functions of the various elements shown and described herein may be provided through the use of dedicated hardware as well as hardware capable of executing software in association with appropriate software as set forth herein.

In the disclosure hereof any element expressed as a means for performing a specified function is intended to encompass any way of performing that function including, for example, a) a combination of circuit elements and associated hardware which perform that function or b) software in any form, including, therefore, firmware, microcode or the like as set forth herein, combined with appropriate circuitry for executing that software to perform the function. Applicants thus regard any means which can provide those functionalities as equivalent to those shown herein.

Similarly, it will be appreciated that the system and process flows described herein represent various processes which may be substantially represented in computer-readable media and so executed by a computer or processor, whether or not such computer or processor is explicitly shown. Moreover, the various processes can be understood as representing not only processing and/or other functions but, alternatively, as blocks of program code that carry out such processing or functions.

The methods, systems, computer programs and mobile devices of the present disclosure, as described above and shown in the drawings, among other things, provide for improved data analysis methods, systems and machine readable programs for carrying out the same. It will be apparent to those skilled in the art that various modifications and variations can be made in the devices, methods, software programs and mobile devices of the present disclosure without departing from the spirit or scope of the disclosure. Thus, it is intended that the present disclosure include modifications and variations that are within the scope of the subject disclosure and equivalents.

What is claimed is:

1. A graph based computer-implemented method of quantifying the relationship between a news story and a company not explicitly mentioned by the news story, wherein each of the news story and the company is associated with a discrete node in the graph database, the method comprising:
   receiving a first input identifying the news story by way of an interactive graphical user interface;
   receiving a second input identifying the company not explicitly mentioned by the news story based at least in part on content derived from the news story;
   receiving user-selectable criteria weighting factor input by way of at least one interactive user adjustable graphical user interface object in the interactive graphical user interface to directly set magnitudes of each of a plurality of weighting factors to link the news story and the company in the graph database;
   associating the news story and the company with respective discrete first and second nodes in a graph database via a processor;
   identifying a plurality of pathways that connect the first node and second node in the graph database based on the user-selectable criteria received via the interactive graphical user interface, wherein each user-selectable criterion in the user-selectable criteria relates to a discrete relationship attribute, wherein the user-selectable criteria are assigned weighting factors that are selectively adjustable by a user via the interactive graphical user interface, and further wherein a shortest path is computed between the first node and the second node by (i) assigning to every node a tentative distance value, (ii) setting an initial node as a current node and marking all other nodes as unvisited, (iii) for the current node, considering all of the current node's neighbors and calculating the relative distances between the current node and the current node's neighbors, (iv) marking the current node as visited, and (v) selecting an unvisited node and marking the unvisited node as a new current node, and returning to step (iii) and repeating steps (iv) and (v) until desired number of shortest pathways is computed; and
   selecting a subset of the identified pathways based on a path length of each identified pathway, wherein the subset is selected by selecting pathways between the first node and second node that have the shortest lengths;
   generating a relevance score for each pathway in the subset of identified pathways by (i) computing a path length associated with each of the plurality of shortest pathways, (ii) aggregating the path lengths of the plurality of shortest pathways to determine an aggregate length, and (iii) transforming the aggregate length into the relevance score for each pathway in the subset;
   generating output display data via processor to be displayed on the interactive graphical user interface illustrating the relationship between the news story and the company, wherein the output display data includes (i) the relevance score for each pathway in the subset of identified pathways, (ii) a graphic depicting the first node, second node, and the subset of identified pathways connecting the first node and second node, and (iii) a plurality of natural language sentences, wherein each of said natural language sentences corresponds to one of the pathways in the subset of identified pathways, wherein at least one of said pathways in the subset of identified pathways passes through a further node connecting the first node and the second node that illustrates a hidden, attenuated or subdued connection that connects the news story to the company.

2. The graph based computer-implemented method of claim 1, wherein the output display data evidences at least one direct relevance linking the news story to the company and at least one hidden relevance linking the news story to the company.

3. The graph based computer-implemented method of claim 2, wherein the output display data evidences whether a person mentioned in the news article is or was associated with the company.

4. The graph based computer-implemented method of claim 1, wherein the user-selectable criteria relate to a plurality of (i) an economic sector, (ii) an industry group, (iii) whether the first company has a parent, (iv) whether the first company has a subsidiary, (v) whether the first company has a supplier, (vi) whether the first company is a supplier for another entity, (vii) whether an individual is a board member or director of the first company, (vii) whether the first company is an insider organization, (viii) whether the first company has an ultimate parent; (ix) whether the first company has a business relationship with a second company, and (x) whether the first company and a second company have a person in common.

5. The graph based computer-implemented method of claim 1,
wherein each of said textual natural language sentence summarizes the subject matter of each respective pathway in the subset of identified pathways, each of said natural language sentences fully summarizing every step of every pathway between every node that connects the first node and the second node; and
displaying the textual natural language sentences in the interactive graphical user interface.

6. The graph based computer-implemented method of claim 5, wherein a user can selectively highlight visual representations relating to each pathway in the subset of identified pathways in the interactive graphical user interface.

7. The graph based computer-implemented method of claim 6, wherein the user can selectively highlight visual representations of each pathway in the subset of identified pathways by hovering a cursor over the visual representation of a selected pathway in the interactive graphical user interface.

8. The graph based computer-implemented method of claim 7, wherein the visual representation of each pathway in the subset of identified pathways includes at least a visual rendering of each pathway the subset of identified pathways and first and second nodes.

9. The graph based computer-implemented method of claim 8, wherein the visual representation of each pathway includes the textual natural language sentences.

10. The graph based computer-implemented method of claim 9, wherein selectively highlighting the visual representation of a selected pathway in the interactive graphical user interface causes each pathway to be highlighted in the rendering of the subset of identified pathways and first and second nodes, and also causes the corresponding textual natural language sentence in the graphical user interface to also be highlighted.

11. A non-transitory computer readable medium storing a computer program to operate an online financial portfolio portal computer system comprising at least one processor, memory and a plurality of circuits to generate and display an interactive graphical user interface on a display, wherein the interactive graphical user interface presents a listing of a plurality of securities, each security relating to a company, wherein the computer program comprises instructions to:
receive a first input identifying a first company in the portfolio via processor;
receive a second input identifying a news story via processor, wherein the news story does not explicitly mention the first company;
associate the first company and the news story with respective discrete first and second nodes in a graph database via processor based at least in part on content from the news story;
receive user-selectable criteria weighting factor input by way of at least one interactive user adjustable graphical user interface object to directly set magnitudes of each of a plurality of weighting factors to link the first node and the second node in the graph database;
based on the user-selectable criteria weighting factor input, identify a plurality of pathways that connect the first and second nodes in the graph database, wherein each user-selectable criterion in the user-selectable criteria weighting factor input relates to a discrete relationship attribute, wherein the user-selectable criteria weighting factor input are assigned weighting factors that are selectively adjustable by a user through the interactive graphical user interface, and further wherein a shortest path is computed between the first node and the second node by (i) assigning to every node a tentative distance value, (ii) setting an initial node as a current node and marking all other nodes as unvisited, (iii) for the current node, considering all of the current node's neighbors and calculating the relative distances between the current node and the current node's neighbors, (iv) marking the current node as visited, and (v) selecting an unvisited node and marking the unvisited node as a new current node, and returning to step (iii) and repeating steps (iv) and (v) until desired number of shortest pathways is computed;
compute a pathway score for each identified pathway in the plurality of pathways via processor;
select a subset of the identified pathways based on a magnitude of the pathway score for each identified pathway via processor, wherein the subset is selected by selecting pathways between the first node and second node that have the shortest lengths;
generate a relevance score for each pathway in the subset of identified pathways by (i) computing a path length associated with each of the pathways in the subset, (ii) aggregating the path lengths of the pathways in the subset to determine an aggregate length, and (iii) transforming the aggregate length into the relevance score for each pathway in the subset; and
generate output display data based on the subset of the identified pathways that summarizes the relationship between the first company and the news story via processor, wherein the output display data includes (i) the relevance score for each pathway in the subset of identified pathways, (ii) a graphic depicting the first node, second node, and the subset of identified pathways connecting the first node and second node, and (iii) a plurality of natural language sentences, wherein each of said natural language sentences corresponds to one of the pathways in the subset of identified pathways, wherein at least one of said pathways in the subset of identified pathways passes through a further node connecting the first node and the second node that illustrates a hidden, attenuated or subdued connection that connects the news story to the company.

12. The non-transitory computer readable medium of claim 11, wherein the program further comprises instructions to display the output display data in the interactive graphical user interface via processor.

13. The non-transitory computer readable medium of claim 11, wherein the interactive graphical user interface provides a first input field for receiving the first input from a user, and a second input field for receiving the second input from the user.

14. The non-transitory computer readable medium of claim 11, wherein the user-selectable criteria weighting factor input relate to: (i) an economic sector, (ii) an industry group, (iii) whether the first company has a parent, (iv) whether the first company has a subsidiary, (v) whether the first company has a supplier, (vi) whether the first company is a supplier for another entity, (vii) whether an individual is a board member or director of the first company, (vii) whether the first company is an insider organization, (viii) whether the first company has an ultimate parent; (ix) whether the first company has a business relationship with a second company, and (x) whether the first company and a second company have a person in common.

* * * * *